United States Patent [19]

Yagi et al.

[11] Patent Number: 5,115,067

[45] Date of Patent: May 19, 1992

[54] MOLECULARLY ORIENTED MOLDED BODY OF ULTRA-HIGH-MOLECULAR WEIGHT ETHYLENE/α-OLEFIN COPOLYMER

[75] Inventors: Kazuo Yagi, Ohtake; Akinori Toyota, Iwakuni, both of Japan

[73] Assignee: Mitsui Petrochemical Industries, Ltd., Tokyo, Japan

[21] Appl. No.: 504,105

[22] Filed: Apr. 4, 1990

Related U.S. Application Data

[63] Continuation of Ser. No. 179,399, Apr. 8, 1988, abandoned.

[30] Foreign Application Priority Data

May 6, 1987 [JP] Japan .................. 62-108813
May 6, 1987 [JP] Japan .................. 62-108814
May 7, 1987 [JP] Japan .................. 62-109724
May 7, 1987 [JP] Japan .................. 62-109725

[51] Int. Cl.$^5$ .................. C08F 210/02; D01F 6/00
[52] U.S. Cl. .................. 526/348.1; 524/275; 524/277; 524/321; 524/487; 524/489; 524/490; 524/570; 524/579; 428/902; 264/177.13
[58] Field of Search .................. 526/348.1; 428/902; 524/275, 277, 487, 489, 490, 321, 570, 579

[56] References Cited

U.S. PATENT DOCUMENTS 4,422,993 12/1983 Smith et al. .................. 264/210.8

OTHER PUBLICATIONS

Schwartz, Plastics Materials and Processes, Van Nostrand Reinhold, N.Y., N.Y. (1982) p. 74.

Primary Examiner—Fred Teskin
Attorney, Agent, or Firm—Sherman and Shalloway

[57] ABSTRACT

Disclosed is a molecularly oriented molded body of an ultra-high-molecular-weight ethylene/α-olefin copolymer having an intrinsic viscosity ($\eta$) of at least 5 dl/g and such a content of an α-olefin having at least 3 carbon atoms that the number of molecules of the α-olefin is 0.1 to 15 on the average per 1000 carbon atoms, wherein the molded body shows at least two crystal fusion endothermic peaks when the measurement is conducted in the restraint state by using a differential scanning calorimeter, the molded body has at least one crystal fusion endothermic peak (Tp) at a temperature higher by at least 20° C. than the inherent crystal fusion temperature (Tm) of the ultra-high-molecular-weight ethylene/α-olefin copolymer determined as the main fusion endothermic peak at the time of the second elevation of the temperature, and the quantity of heat based on said crystal fusion endothermic peak (Tp) is at least 15% based on the total fusion heat quantity.

19 Claims, 17 Drawing Sheets

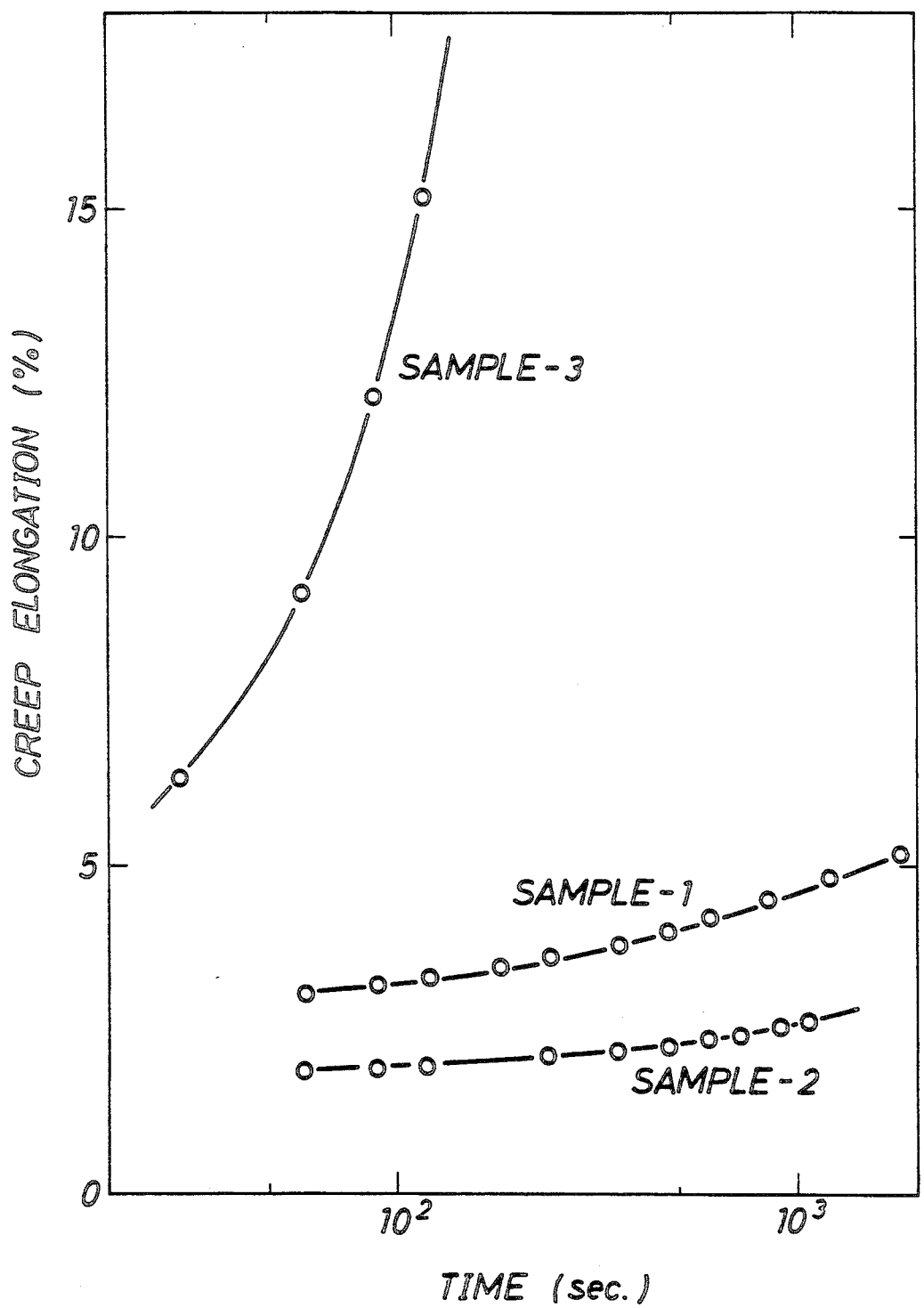

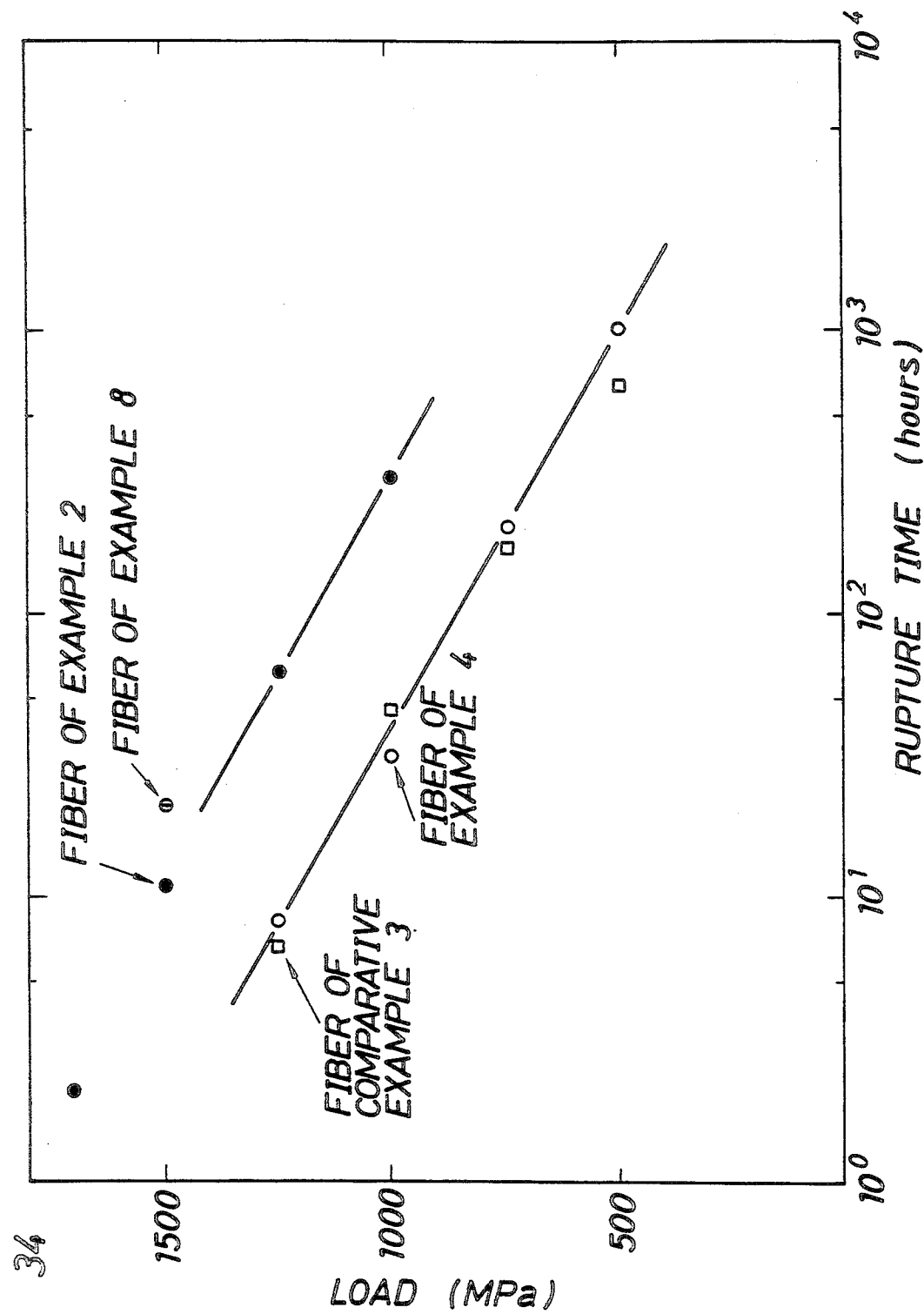

MOLECULARLY ORIENTED MOLDED BODY OF ULTRA-HIGH-MOLECULAR WEIGHT ETHYLENE/α-OLEFIN COPOLYMER

This application is a continuation of application Ser. No. 07/179,399 filed Apr. 8, 1988 now abandoned.

BACKGROUND OF THE INVENTION (1) Field of the Invention

The present invention relates to a molecularly oriented molded body of an ultra-high-molecular-weight ethylene/α-olefin copolymer. More particularly, the present invention relates to a molecularly oriented molded body, especially a fiber, of an ultra-high-molecular-weight ethylene/α-olefin copolymer, which has novel crystal fusion characteristics and is excellent in heat resistance and creep resistance.

(2) Description of the Prior Art

It is known that a molecularly oriented molded body having high elastic modulus and high tensile strength is prepared by molding ultra-high-molecular-weight polyethylene into a fiber, a tape or the like and drawing the molded product. For example, Japanese Patent Application Laid-Open Specification No. 15408/81 discloses a process comprising spinning a dilute solution of ultra-high-molecular-weight polyethylene and drawing the obtained filaments. Furthermore, Japanese Patent Application Laid-Open Specification No. 130313/84 discloses a process comprising melt-kneading ultra-high-molecular-weight polyethylene with a wax, extruding the kneaded mixture, cooling and solidifying the extrudate and drawing the solidified extrudate. Furthermore, Japanese Patent Application Laid-Open Specification No. 187614/84 discloses a process comprising extruding the above-mentioned melt-kneaded mixture, drafting the extrudate, then cooling and solidifying the extrudate and drawing the solidified extrudate.

When ultra-high-molecular-weight polyethylene is molded into the form of a fiber and the fiber is strongly drawn, the elastic modulus and tensile strength are increased with increase of the draw ratio, and the obtained fiber has such excellent mechanical properties as high elastic modulus and high tensile strength and are excellent in the light weight characteristic, water resistance and weather-ability. However, the heat resistance is inevitably restricted because the melting point of polyethylene is relatively low and generally in the range of from 120° to 140° C. Furthermore, when a fiber of ultra-high-molecular-weight polyethylene is used at a high temperature, the strength retention ratio is drastically reduced and the creep is extraordinarily increased.

SUMMARY OF THE INVENTION

It is therefore a primary object of the present invention to provide a molecularly oriented molded body of the ultra-high-molecular-weight polyethylene type, which has novel crystal fusion characteristics and is highly improved in heat resistance and creep resistance.

Another object of the present invention is to provide a molecularly oriented molded body of the ultra-high-molecular-weight polyethylene type, which shows very high strength retention ratio and elastic modulus retention ratio even when the molded body is subjected to a high-temperature heat history, for example, a heat treatment conducted at 170° C. for 5 minutes, and in which the creep is controlled to a very low level at a high temperature.

We found that when an ultra-high-molecular-weight ethylene/α-olefin copolymer formed by copolymerizing ethylene with a specific small amount of an α-olefin having at least 3 carbon atoms is extrusion-molded and strongly drawn to form a molecularly oriented molded body, there is obtained a novel molecularly oriented molded body which shows a phenomenon of elevation of the fusion temperature, not observed in the conventional polyethylene draw-molded bodies, and that this molecularly oriented molded body has such high-temperature mechanical characteristics that even when the molecularly oriented molded body is heat-treated at 170° C. for 5 minutes, the strength or elastic modulus is hardly reduced or is improved conversely. It also was found that this molecularly oriented molded body has a prominently improved creep resistance while it retains high strength and high elastic modulus inherent to a draw-molded body of ultra-high-molecular-weight polyethylene.

More specifically, in accordance with the present invention, there is provided a molecularly oriented molded body of an ultra-high-molecular-weight ethylene/α-olefin copolymer having an intrinsic viscosity ($\eta$) of at least 5 dl/g and such a content of an α-olefin having at least 3 carbon atoms that the number of molecules of the α-olefin is 0.1 to 15 on the average per 1000 carbon atoms, wherein the molded body shows at least two crystal fusion endothermic peaks when the measurement is conducted in the restraint state by using a differential scanning calorimeter, the molded body has at least one crystal fusion endothermic peak (Tp) at a temperature higher by at least 20° C. than the inherent crystal fusion temperature (Tm) of the ultra-high-molecular-weight ethylene/α-olefin copolymer determined as the main fusion endothermic peak at the time of the second elevation of the temperature, and the quantity of heat based on said crystal fusion endothermic peak (Tp) is at least 15% based on the total fusion heat quantity.

BRIEF DESCRIPTION OF THE DRAWINGS

FIG. 9 shows creep characteristic curves of the drawn and oriented fibers of the polymers obtained in Example 1, Example 2 and Comparative Example 1.

FIG. 34 is a graph illustrating the relations between the load applied at room temperature and the rupture time, observed in the fibers obtained in the examples.

DETAILED DESCRIPTION OF THE PREFERRED EMBODIMENTS

Figure 1:
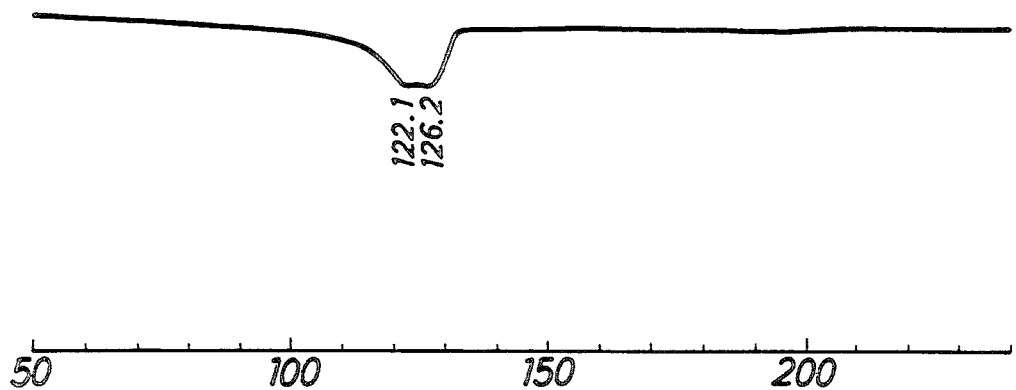
FIG. 1 shows an endothermic characteristic curve of a powder of an ultra-high-molecular-weight ethylene/-butene-1 copolymer used in Example 1 determined by a differential scanning calorimeter.

The present invention is based on the surprising finding that when an ultra-high-molecular-weight ethylene/α-olefin copolymer formed by copolymerizing ethylene with a specific amount of an α-olefin having at least 3 carbon atoms is extrusion-molded and then strongly drawn to form a molecularly oriented molded body, the melting point of the polymer chain constituting the molecularly oriented molded body is elevated even under the restraint condition.

Incidentally, the term "restraint state" or "restraint condition" used in the instant specification and appended claims means the state where no positive stretch is given to the molecularly oriented molded body but both the ends of the molded body are fixed or the molded body is wound on other article such as a frame so that free deformation is not allowed.

The melting point of a polymer is attributed to fusion of a crystal in the polymer and is generally measured as a temperature of an endothermic peak, caused by fusion of the crystal, by a differential scanning calorimeter.

This endothermic peak temperature is constant in polymers of the same kind and is hardly changed by a post treatment such as a drawing treatment or a crosslinking treatment. Even by the drawing heat treatment known to cause a greatest change, the endothermic peak temperature is increased only by about 15° C. at largest.

FIGS. 1, 2, 3 and 4 show endothermic curves, determined by a differential scanning calorimeter, of a starting ultra-high-molecular-weight ethylene/butene-1 copolymer used in the present invention, a highly drawn filament of this ethylene/butene-1 copolymer, ordinary starting ultra-high-molecular-weight polyethylene and a highly drawn filament of this ultra-high-molecular-weight polyethylene, respectively. The endothermic curves of the highly drawn filaments are those determined under the restraint condition. Incidentally, in determining the endothermic curves of the starting polymer powders shown in FIGS. 1 and 3, the measurement was carried out according to the method of ASTM D-3418 in order to expel various histories of the polymerization. The composition of each polymer and the filament-treating conditions are illustrated in the examples given hereinafter.

From the results shown in FIGS. 1 through 4, it is understood that the drawn filament of the ordinary ultra-high-molecular-weight polyethylene shows an endothermic peak, attributed to the fusion of the crystal, at a temperature of about 150° C. higher by about 15° C. than the endothermic peak temperature of the starting ultra-high-molecular-weight polyethylene, whereas the drawn filament of the ultra-high-molecular-weight ethylene/butene-1 copolymer according to the present invention shows an endothermic peak at a temperature higher by at least about 20° C. than the endothermic peak temperature of the starting copolymer and the endothermic peak of the drawn filament of the copolymer is rendered multiplex as compared with the endothermic peak of the drawn filament of the ultra-high-molecular-weight homopolymer of ethylene.

Figure 2:
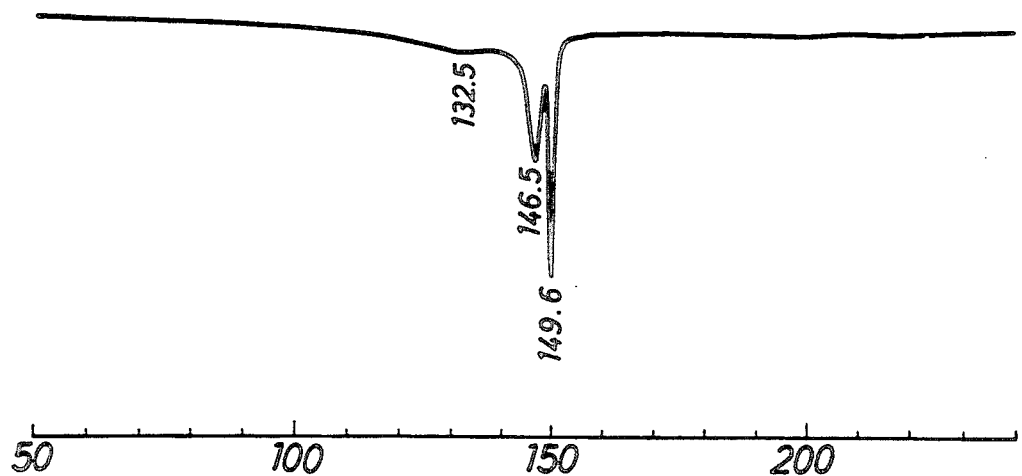
FIG. 2 shows an endothermic characteristic curve of a drawn and oriented fiber of the ultra-high-molecular-weight ethylene/butene-1 copolymer obtained in Example 1, determined by a differential scanning calorimeter in the restraint state.
Figure 5:
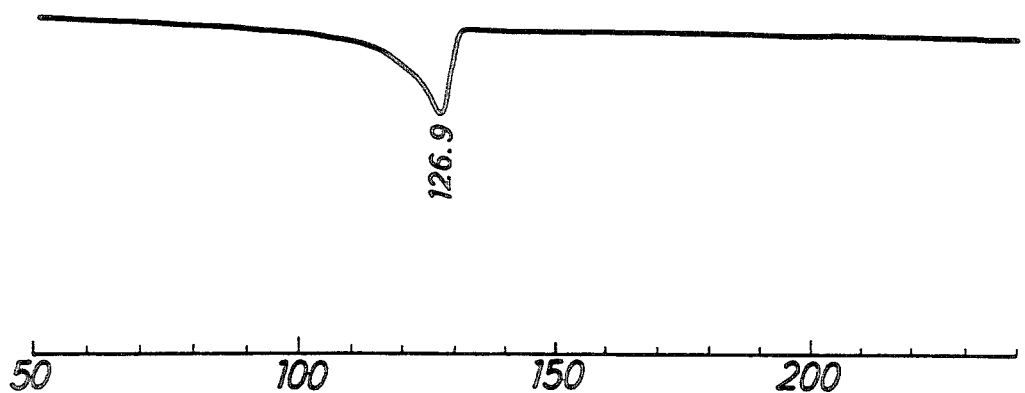
FIG. 5 shows an endothermic characteristic curve obtained when the sample shown in FIG. 2 is subjected to the second temperature elevation measurement (second run).
Figure 3:
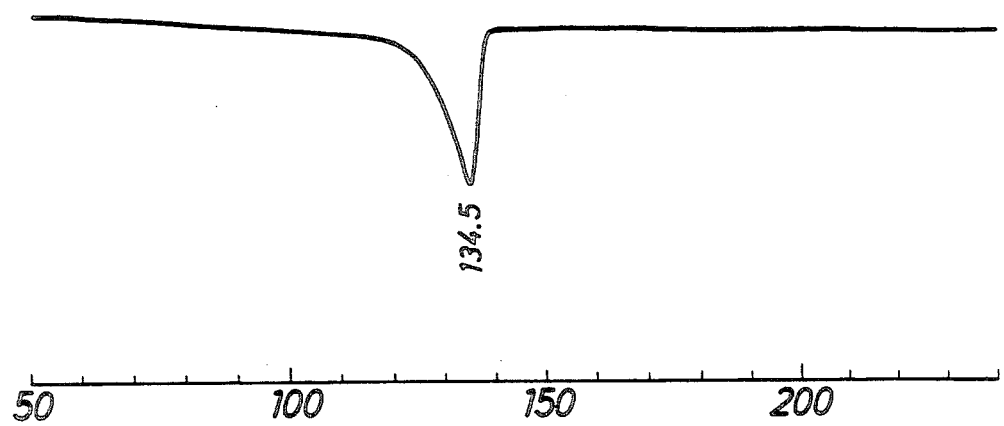
FIG. 3 shows an endothermic characteristic curve of a powder of ultra-high-molecular-weight polyethylene used in Comparative Example 1, determined by a differential scanning calorimeter.

FIG. 5 shows an endothermic curve obtained when the sample shown in FIG. 2 is subjected to the second run (the second temperature elevation measurement conducted after the measurement of FIG. 2). From the results shown in FIG. 5, it is seen that at the second run, the main peak of the fusion of the crystal appears at substantially the same temperature as the temperature of the fusion peak of the starting ultra-high-molecular-weight ethylene/butene-1 copolymer and the molecular orientation in the sample substantially disappears at the measurement of the data of FIG. 5. Accordingly, it is understood that the change of the endothermic peak to the high temperature side in the sample of FIG. 2 has a close relation to the molecular orientation in the molded body.

Figure 4:
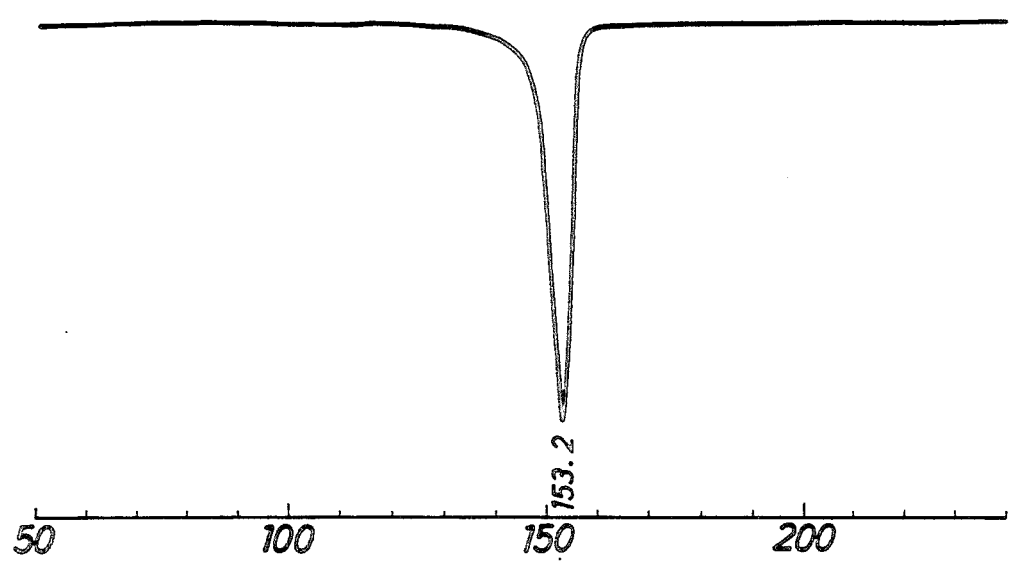
FIG. 4 shows an endothermic characteristic curve of a drawn and oriented fiber of the ultra-high-molecular-weight polyethylene obtained in Comparative Example 1, determined by a differential scanning calorimeter in the restraint state.

Moreover, from the comparison of FIG. 2 with FIG. 4, it is understood that the fact that the endothermic peak in the sample of FIG. 2 is rendered multiplex has a close relation to the presence of a branched chain formed by inclusion of a small amount of butene-1 into the polymer chain.

Figure 10:
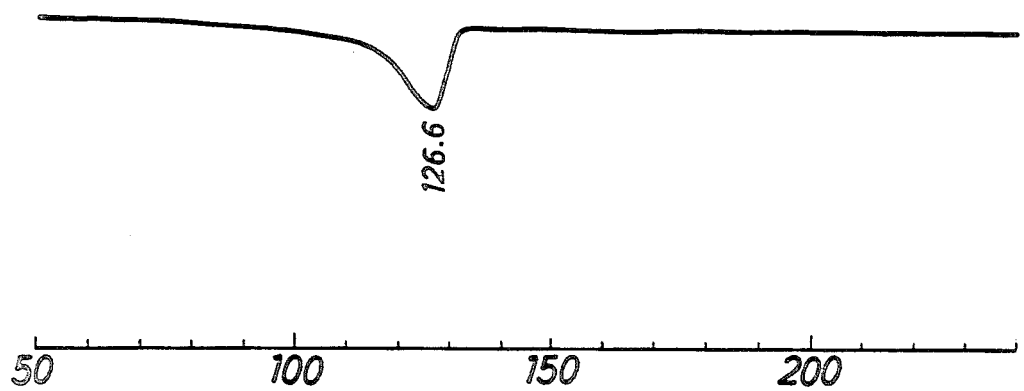
FIG. 10 shows an endothermic characteristic curve of a polymer of an ultra-high-molecular-weight ethylene/propylene copolymer used in Example 3, determined by a differential scanning calorimeter.
Figure 16:
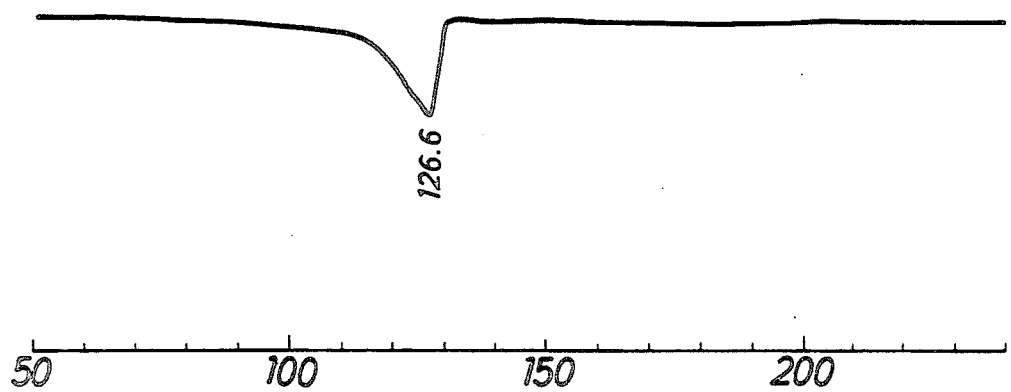
FIG. 16 shows an endothermic characteristic curve of a powder of an ultra-high-molecular-weight ethylene/4-methylpentene-1 copolymer used in Example 5, determined by a differential scanning calorimeter.
Figure 28:
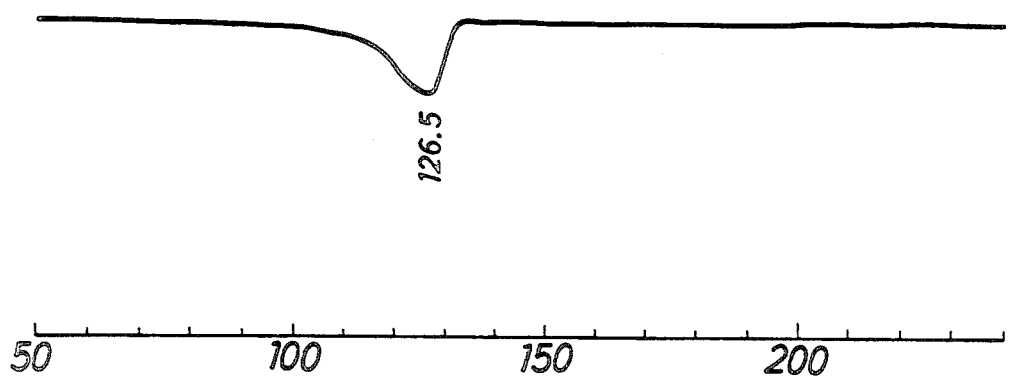
FIG. 28 shows an endothermic characteristic curve of a powder of an ultra-high-molecular-weight ethylene/propylene/4-methylpentene-1 copolymer used in Example 9, determined by a differential scanning calorimeter.

These tendencies are similarly observed in an ultra-high-molecular-weight ethylene/propylene copolymer (FIGS. 10 through 12), an ultra-high-molecular-weight ethylene/4-methylpentene-1 copolymer (FIGS. 16 through 18), an ultra-high-molecular-weight ethylene/hexene-1 copolymer (FIGS. 21 and 22), an ultra-high-molecular-weight ethylene/octene-1 copolymer (FIGS. 23 and 24) and an ultra-high-molecular-weight ethylene/propylene/4-methylpentene-1 copolymer (FIGS. 28 through 30) as well as in the above-mentioned ultra-high-molecular-weight ethylene/butene-1 copolymer.

In view of the ordinary fact that introduction of a comonomer component in a polymer chain results in reduction of the crystallinity and lowering of the melting point, it is quite surprising that in the molecularly oriented molded body of the present invention, by using a copolymer formed by copolymerizing ethylene with a small amount of at least one α-olefin, the melting point of the molecularly oriented molded body is maintained at a level equal to or higher than the melting point of the molecularly oriented molded body of ultra-high-molecular-weight polyethylene and, as described hereinafter, the creep resistance is highly improved.

The reason why the crystal fusion temperature is shifted to the high temperature side in the molecularly oriented molded body of the present invention has not been completely elucidated. However, if the above-mentioned measurement results are analyzed, it is presumed that this may be due to the following mechanism. Namely, in a molecularly oriented molded body of ultra-high-molecular-weight polyethylene, it is considered that many polymer chains pass through crystalline and amorphous zones alternately and are oriented in the drawing direction. In a molecularly oriented molded body of a copolymer formed by introducing a small amount of an α-olefin such as 4-methylpentene-1 into this ultra-high-molecular-weight polyethylene by copolymerization, it is believed that the portion of the introduced α-olefin chain, that is, the portion where the side chain is formed, is selectively rendered amorphous, and the portion of the repeated ethylene chains becomes an oriented crystalline portion through this amorphous portion. In this case, since side chains introduced into the polymer chain in a number of 0.1 to 15 on the average per 1000 carbon atoms are concentrated in the amorphous portion, the orientation crystallization of the repeated ethylene chains is regularly advanced to a larger size or entanglement of the molecule chains is increased in the amorphous portions on both the ends of the oriented crystalline portion, with the result that the polymer chain becomes immobile and the melting point of the oriented crystalline portion rises.

The molecularly oriented molded body of the present invention is characterized in that even when the molded body is heat-treated at 170° C. for 5 minutes, the strength is not substantially reduced from the strength of the untreated molded body and the elastic modulus is improved over that of the untreated molded body. Moreover, this molecularly oriented molded body is prominently excellent in the creep resistance at high temperatures, and the creep ($CR_{90}$) determined according to the method described hereinafter is less than ½ of that of an oriented molded body of ordinary ultra-high-molecular-weight polyethylene and the creep speed $\epsilon_{90-180}$ (sec$^{-1}$) is lower by at least one figure, especially by at least 2 figures, than that of the oriented molded body of ordinary ultra-high-molecular-weight polyethylene. It is deemed that such prominent improvements of the characteristics are due to the above-mentioned novel micro-structure of the oriented crystalline portion.

It is important that the ethylene/α-olefin copolymer used for the molecularly oriented molded body of the present invention should contain an α-olefin having at least 3 carbon atoms in such an amount that the number of α-olefin molecules is 0.1 to 15, especially 1.0 to 10 in the case where the α-olefin is propylene, 0.5 to 10 in case of an α-olefin having at least 3 carbon atoms, on the average per 1000 carbon atoms. Namely, a copolymer comprising an α-olefin having at least 3 carbon atoms gives a molecularly oriented molded body excellent in the creep characteristics over a molecularly oriented molded body formed from ultra-high-molecular-weight polyethylene. The reason is considered to be that a long side chain present in the amorphous portion enhances the immobility of the polymer chain. It also is very important that the α-olefin should be contained in the above-mentioned amount. If the content is below the above-mentioned range, the effect of increasing the crystal fusion temperature by the molecular orientation is not substantially attained, and if the content exceeds the above-mentioned range, the melting point of the ethylene/α-olefin copolymer is liable to lower and the effect of the crystal fusion temperature by the molecular orientation and the elastic modulus are reduced.

In the case where the α-olefin is butene-1 or an α-olefin having at least 5 carbon atoms, a molecularly oriented molded body having a higher creep resistance than that of a molecularly oriented molded body of ultra-high-molecular-weight polyethylene or an ultra-high-molecular-weight ethylene copolymer containing propylene is obtained. On the other hand, an ultra-high-molecular-weight ethylene copolymer containing propylene as the comonomer is advantageous over ultra-high-molecular-weight polyethylene in that drawing can be performed at a higher draw ratio, and since drawing at a higher ratio becomes possible, the elastic modulus and tensile strength can be further improved. Moreover, an ultra-high-molecular-weight ethylene copolymer comprising at least two α-olefins as the α-olefin comonomer, that is, propylene as the first comonomer and an α-olefin having at least 4 carbon atoms, for example, butene-1, 4-methylpentene-1 or hexene-1, as the remaining comonomer is advantageous over ultra-high-molecular-weight polyethylene or an ultra-high-molecular-weight copolymer of ethylene with an α-olefin having at least 5 carbon atoms in that drawing can be performed at a higher draw ratio, and therefore, the elastic modulus and tensile strength can be further improved. Moreover, this copolymer is especially excellent in the creep resistance over ultra-high-molecular-weight polyethylene or an ultra-high-molecular-weight ethylene/propylene copolymer, and a molecularly oriented molded body having a good balance among the elastic modulus, tensile strength and creep resistance is provided.

In view of the mechanical characteristics and heat resistance of the molecularly oriented molded body, it is important that the intrinsic viscosity ($\eta$) of the ethylene/α-olefin copolymer should be at least 5 dl/g, especially 7 to 30 dl/g. Since the ends of the molecular chain make no contribution to the strength of the fiber and the number of the ends of the molecular chain is a reciprocal number of the molecular weight (viscosity), it is understood that a copolymer having a high intrinsic viscosity ($\eta$) gives a high strength.

In view of the heat resistance, that is, the strength or elastic modulus retention ratio at a high temperature or the creep resistance at a high temperature, it is important that the molecularly oriented molded body of the present invention should have at least one crystal fusion endothermic peak (Tp) at a temperature higher by at least 20° C. than the inherent crystal fusion temperature (Tm) of the ultra-high-molecular-weight ethylene/α-olefin copolymer determined as the main fusion endothermic peak at the time of the second elevation of the temperature, and that the quantity of heat based on this crystal fusion endothermic peak (Tp) should be at least 15%, especially at least 30%, based on the total fusion heat quantity.

Namely, a molecularly oriented molded body having no crystal fusion endothermic peak (Tp) at a temperature higher by at least 20° C. than Tm or a molecularly oriented molded body which has a crystal fusion endothermic peak at a temperature higher by at least 20° C. than Tm but in which the endothermic heat quantity based on this peak is smaller than 15% based on the total fusion heat quantity has such a tendency that the strength retention ratio or elastic modulus retention ratio is substantially reduced when the heat treatment is carried out at 170° C. for 5 minutes and the creep or the creep speed is increased at the time of heating.

For better illustration of the present invention, the starting material, the preparation process and the intended product will now be described successively.

Starting Material

The ultra-high-molecular-weight ethylene/α-olefin copolymer is obtained, for example, by slurry-polymerizing ethylene and an α-olefin having at least 3 carbon atoms as the comonomer in an organic solvent in the presence of a Ziegler catalyst.

At least one member selected from the group consisting of propylene, butene-1, pentene-1, 4-methylpentene-1, hexene-1, heptene-1 and octene-1 is used as the α-olefin having at least 3 carbon atoms. In view of the creep resistance, an α-olefin having at least 6 carbon atoms, such as 4-methyl-pentene-1, hexene-1 or octene-1, is preferred. In view of the drawability, propylene is especially preferred. The α-olefin copolymer should be used in such an amount that the α-olefin content per 1000 carbon atoms in the polymer chain is within the above-mentioned range. Moreover, the ultra-high-molecular-weight ethylene/α-olefin copolymer should have a molecular weight corresponding to the above-mentioned intrinsic viscosity ($\eta$).

If the α-olefin content is smaller than 0.1 α-olefin molecule per 1000 carbon atoms, a structure effective for improving the creep resistance cannot be formed. On the contrary, if the α-olefin content exceeds 15 α-olefin molecules per 1000 carbon atoms, the crystallinity is drastically reduced and a high elastic modulus cannot be obtained.

In the ultra-high-molecular-weight ethylene/α-olefin copolymer of the present invention, the determination of the α-olefin component is carried out by using an infrared spectrophotometer (supplied by Nippon Bunko Kogyo). Namely, the absorbance at 1378 cm$^{-1}$, which indicates the deformation vibration of the methyl group of the α-olefin included in the ethylene chain, is measured, and the measured value is converted to the number of the methyl branches per 1000 carbon atoms by using a calibration curve prepared in advance by using a model compound in a $^{13}$C nuclear magnetic resonance spectroscopy.

Preparation Process

In order to make melt-molding of the ultra-high-molecular-weight ethylene/α-olefin copolymer possible, a diluent is incorporated in the above-mentioned components. A solvent for the ultra-high-molecularweight ethylene copolymer or a wax having a compatibility with the ultra-high-molecular-weight ethylene copolymer is used as the diluent.

A solvent having a boiling point higher, especially by at least 20° C., than the melting point of the above-mentioned copolymer is preferably used as the solvent.

As specific examples of the solvent, there can be mentioned aliphatic hydrocarbon solvents such as n-nonane, n-decane, n-undecane, n-dodecane, n-tetradecane, n-octadecane, liquid paraffin and kerosine, aromatic hydrocarbon solvents and hydrogenation products thereof such as xylene, naphthalene, tetralin, butylbenzene, p-cymene, cyclohexylbenzene, diethylbenzene, benzylbenzene, dodecylbenzene, bicyclohexyl, decalin, methylnaphthalene and ethylnaphthalene, halogenated hydrocarbon solvents such as 1,1,2,2-tetrachloroethane, pentachloroethane, hexachloroethane, 1,2,3-trichloropropane, dichlorobenzene, 1,2,4-trichlorobenzene and bromobenzene, and mineral oils such as paraffinic process oil, naphthenic process oil and aromatic process oil.

Aliphatic hydrocarbon compounds and derivatives thereof can be used as the wax.

A so-called paraffinic wax composed mainly of a saturated aliphatic hydrocarbon compound having a molecular weight lower than 2000, preferably lower than 1000, especially preferably lower than 800, is mentioned as the aliphatic hydrocarbon compound. As specific examples of the aliphatic hydrocarbon compound, there can be mentioned n-alkanes having at least 22 carbon atoms, such as docosane, tricosane, tetracosane and triacontane, mixtures comprising an n-alkane as mentioned above as the main component and a lower n-alkane, so-called paraffin waxes separated and purified from petroleum, medium-pressure, low-pressure and high-pressure polyethylene waxes and ethylene copolymer waxes, which are low-molecular-weight polymers obtained by homopolymerizing ethylene or copolymerizing ethylene with other α-olefin, waxes formed by reducing the molecular weight of polyethylene such as medium-pressure, low-pressure or high-pressure polyethylene by thermal degradation, and oxidized waxes and maleic acid-modified waxes obtained by oxidizing the foregoing waxes or modifying the foregoing waxes with maleic acid.

As the aliphatic hydrocarbon compound derivative, there can be mentioned, for example, fatty acids, aliphatic alcohols, fatty acid amides, fatty acid esters, aliphatic mercaptans, aliphatic aldehydes and aliphatic ketones having at least 8 carbon atoms, preferably 12 to 50 carbon atoms, and a molecular weight of 130 to 2000, preferably 200 to 800, in which at least one, preferably 1 or 2, especially preferably one, of a functional group such as a carboxyl group, a hydroxyl group, a carbamoyl group, an ester group, a mercapto group or a carbonyl group is contained at the end or in the interior of an aliphatic hydrocarbon group such as an alkyl group or an alkenyl group.

As specific examples, there can be mentioned fatty acids such as capric acid, lauric acid, myristic acid, palmitic acid, stearic acid and oleic acid, aliphatic alcohols such as lauryl alcohol, myristyl alcohol, cetyl alcohol and stearyl alcohol, fatty acid amides such as capric amide, lauric amide, palmitic amide and stearyl amide, and fatty acid esters such as stearyl acetate.

The ultra-high-molecular-weight ethylene copolymer/diluent mixing ratio varies according to the kinds of these components, but it is generally preferred that this mixing ratio be from 3/97 to 80/20, especially from 15/85 to 60/40. If the amount of the diluent is too small and below the above-mentioned range, the melt viscosity becomes too high and melt kneading or melt molding is difficult, and surface roughening of the molded body is conspicuous and breaking is often caused at the drawing step. If the amount of the diluent is too large and exceeds the above-mentioned range, melt-kneading becomes difficult and the drawability of the molded body is insufficient.

It is generally preferred that melt kneading be carried out at 150° to 300° C., especially 170° to 270° C. If melt kneading is carried out at a lower temperature, the melt viscosity is too high and melt molding becomes difficult. If the temperature is too high and exceeds the above-mentioned range, the molecular weight of the ultra-high-molecular-weight ethylene copolymer is reduced by thermal degradation and it becomes difficult to obtain a molded body having high elastic modulus and high strength. Mixing can be performed by dry blending using a Henschel mixer or a V-blender or by melt mixing using a single screw or multi-screws extruder.

Melt molding is generally performed by melt extrusion molding. For example, a filament to be drawn is obtained by melt extrusion through a spinneret, or a film, sheet or tape to be drawn is obtained by extrusion through a flat die or ring die. Furthermore, a pipe (parison) for draw-blow forming is obtained by extrusion through a circular die. The present invention is especially valuable for the production of a drawn filament. In this case, the melt extruded from the spinneret can be drafted, that is, stretched in the molten state. The draft ratio can be defined by the following formula:

$$\text{draft ratio} = V/V_o$$

wherein $V_o$ stands for the extrusion speed of the molten resin in a die orifice, and $V$ stands for the winding speed of the cooled and solidified undrawn filament.

The draft ratio depends on the temperature of the mixture and the molecular weight of the ultra-high-molecular-weight ethylene copolymer, but the draft ratio may be at least 3, preferably at least 6.

Of course, melt molding is not limited to extrusion molding, and in the production of various draw-formed vessels, a preform for draw-blow forming can be prepared by injection molding. Cooling solidification of the molded body can be accomplished by forced cooling means such as air cooling or water cooling.

The so-obtained undrawn molded body of the ultra-high-molecular-weight ethylene copolymer is subjected to a drawing treatment. Of course, the degree of the drawing treatment is such that molecular orientation in at least one axial direction can be effectively imparted to the ultra-high-molecular-weight ethylene copolymer of the molded body.

It is generally preferred that drawing of the molded body of the ultra-high-molecular-weight ethylene copolymer be carried out at a temperature of 40° to 160° C., preferably 80° to 145° C. Any of air, water, steam and liquid media can be used as the heating medium for heating and maintaining the undrawn molded body at the above-mentioned temperature. If a solvent capable of eluting and removing the above-mentioned diluent, which has a boiling point higher than the melting point of the composition of the molded body, for example, decalin, decane, kerosine or the like, is used as the heating medium for the drawing operation, removal of the above-mentioned diluent becomes possible, and drawing unevenness can be eliminated at the drawing step and a high draw ratio can be attained.

Of course, the means for removing the excessive diluent from the ultra-high-molecular-weight ethylene copolymer is not limited to the above-mentioned method. For example, there may be adopted a method in which the undrawn molded body is treated with a solvent such as hexane, heptane, hot ethanol, chloroform or benzene and the undrawn molded body is then drawn, and a method in which the drawn molded body is treated with a solvent such as hexane, heptane, hot ethanol, chloroform or benzene. According to these methods, the excessive diluent can be effectively removed and a drawn product having a high elastic modulus and a high strength can be obtained.

The drawing operation may be carried out in one stage or a plurality of stages. The draw ratio depends on the desired molecular orientation and the resulting improvement of the fusion temperature, but in general, satisfactory results are obtained if the drawing operation is carried out at a draw ratio of 5 to 80, especially 10 to 50.

In general, drawing in a plurality of stages is advantageous, and there is preferably adopted a method in which at the first stage, the drawing operation is carried out at a relatively low temperature of 80° to 120° C. while extracting the diluent from the extrusion-molded body and at the second and subsequent stages, the operation of drawing the molded body is conducted at a temperature of 120° to 160° C., which is higher than the drawing temperature adopted at the first stage.

Uniaxial drawing of a filament or tape is accomplished by performing the drawing operation between rollers differing in the peripheral speed, and a biaxially drawn film is obtained by performing stretch-drawing in the longitudinal direction between rollers differing in the longitudinal direction while performing stretch-drawing in the lateral direction by a tenter or the like. Biaxial drawing can also be performed by the inflation method. A three-dimensional biaxially draw-molded body such as a vessel can be obtained by combination of stretch-drawing in the axial direction and expansion-drawing in the circumferential direction.

The so-obtained molecularly oriented molded body can be heat-treated under a restraint condition, if desired. This heat treatment is carried out at a temperature of 140° to 180° C., especially 150° to 175° C., for 1 to 20 minutes, especially 3 to 10 minutes. By this heat treatment, crystallization of the oriented crystalline portion is further advanced, and the crystal fusion temperature is shifted to the high temperature side, the strength and elastic modulus are improved and the creep resistance at high temperatures is improved.

Molecularly Oriented Molded Body

As pointed out hereinbefore, the molecularly oriented molded body of the ultra-high-molecular-weight ethylene/α-olefin copolymer is characterized in that the molded body has at least one crystal fusion peak (Tp) at a temperature higher by at least 20° C. than the inherent crystal fusion temperature (Tm) of the above-mentioned copolymer and the fusion heat quantity based on the crystal fusion peak (Tp) is at least 15%, preferably at least 20%, especially preferably at least 30%, based on the total fusion heat quantity.

The inherent crystal fusion temperature (Tm) of the ultra-high-molecular-weight ethylene copolymer can be determined by the so-called second run in a differential scanning calorimeter, that is, according to the method in which the molded body of the ethylene copolymer is once fused completely and is then cooled to moderate the molecular orientation and the temperature is elevated again.

More specifically, in the molecularly oriented molded body of the present invention, any crystal fusion peak is not present in the above-mentioned inherent crystal fusion temperature range of the copolymer, or even if a peak is observed in this temperature range, the peak is present only as tailing. The crystal fusion peak (Tp) appears ordinarily in the temperature range of from $Tm+20°$ C. to $Tm+50°$ C. and especially in the temperature range of from $Tm+20°$ C. to $Tm+100°$ C. It often happens that this peak (Tp) appears in the form of a plurality of peaks in the above-mentioned temperature range. In the case of a copolymer comprising an α-olefin having at least 5 carbon atoms, the crystal fusion peak (Tp) often appears in the form of two separate peaks, that is, a higher temperature fusion peak (Tp1) appearing in the temperature range of from $Tm+35°$ C. to $Tm+100°$ C. and a lower temperature fusion peak (Tp2) appearing in the temperature range of from $Tm+20°$ C. to $Tm+35°$ C. Under certain conditions for the preparation of the molecularly oriented molded body, Tp1 or Tp2 comprises a plurality of peaks.

It is considered that the high crystal fusion peak (Tp) prominently improves the heat resistance of the molded body of the ultra-high-molecular-weight ethylene/α-olefin copolymer and makes contributions to maintenance of the strength retention ratio or elastic modulus retention ratio at a high level after the heat history at a high temperature.

It is preferred that the fusion heat quantity based on the high temperature fusion peak (Tp1) in the temperature range of from $Tm+35°$ C. to $Tm+100°$ C. be at least 1.5%, especially at least 3.0%, based on the total fusion heat quantity.

In the case where the fusion heat quantity based on the high temperature fusion peak (Tp) satisfies the above requirement, even if the high temperature fusion peak (Tp1) does not appear as a projecting main peak, that is, even if the peak (Tp1) is an assemblage of small peaks or a broad peak, excellent creep resistance characteristics can be obtained though it sometimes happens that the heat resistance is somewhat degraded.

In the present invention, the melting point and crystal fusion quantity were determined according to the following method.

The melting point was measured by using a differential scanning calorimeter (Model DSC II supplied by Perkin-Elmer Co.), and about 3 mg of a sample was kept in the restraint state by winding the sample on an aluminum sheet having a size of 4 mm×4 mm×0.2 mm (thickness). Then, the sample wound on the aluminum sheet was sealed in an aluminum pan to prepare a sample for the measurement. An aluminum sheet equal to that used for the sample was sealed in an aluminum pan ordinarily kept vacant, to be placed in a reference holder, and a heat balance was kept. At first, the sample was held at 30° C. for about 1 minute, and then, the temperature was elevated to 250° C. at a rate of 10° C./min and the measurement of the melting point at the first temperature elevation was completed. Subsequently, the sample was held at 250° C. for 10 minutes. Then, the temperature was lowered at a rate of 20° C./min and the sample was held at 30° C. for 10 minutes. Then, the temperature was elevated to 250° C. again at a rate of 10° C./min, and the measurement of the melting point at the second temperature elevation (second run) was completed. The maximum value of the fusion peak was designated as the melting point. When the peak appeared as the shoulder, tangential lines were drawn on the bending points on the low temperature side and high temperature side just close to the shoulder, and the intersection point was designated as the melting point.

A base line connecting points of 60° C. and 240° C. in the endothermic curve was drawn, and a perpendicular was drawn at the point higher by about 20° C. than the inherent crystal fusion temperature (Tm) of the ultra-high-molecular-weight ethylene copolymer determined as the main fusion peak at the second temperature elevation. The low temperature portion surrounded by these lines was regarded as being based on the inherent crystal fusion (Tp) and the high temperature portion was regarded as being based on the crystal fusion (Tp) manifesting the functions of the molded body of the present invention. The crystal fusion heat quantities were calculated from areas of these portions. According to the above-mentioned method, the portion surrounded by perpendiculars from Tm+20° C. and from Tm+35° C. was regarded as being based on the fusion of Tp2 and the high temperature portion was regarded as being based on the fusion of Tp1, and the heat quantities based on the fusion of Tp1 and the fusion of Tp2 were similarly calculated from the areas of these portions.

The degree of molecular orientation in the molded body can be determined by the X-ray diffraction method, the birefringence method or the fluorescence polarization method. In case of a drawn filament of the ultra-high-molecular-weight ethylene copolymer according to the present invention, from the mechanical properties, it is preferred that the orientation degree by the half-value width described in detail, for example, in Yukichi Go and Kiichiro Kubo; Kogyo Kagaku Zasshi, 39, 992 (1939), that is, the orientation degree (F) defined by the following formula:

$$\text{orientation degree } (F) = \frac{90° - H°/2}{90°}$$

wherein H° stands for the half-value width (°) of the strength distribution curve along the Debye ring on the strongest paratroop on the equator line, be at least 0.90, especially at least 0.95.

When the drawn filament of the ultra-high-molecular-weight ethylene/α-olefin copolymer is subjected to a heat history at 170° C. for 5 minutes, the strength retention ratio is at least 90%, especially at least 95%, and the elastic modulus retention ratio is at least 90%, especially at least 95%. Namely, the drawn filament has an excellent heat resistance not attainable in conventional drawn filaments of polyethylene.

Furthermore, this drawn filament is especially excellent in the creep resistance characteristics at high temperatures. Namely, the creep determined as the elongation (%) when the filament is maintained under a load corresponding to 30% of the breaking load at an ambient temperature of 70° C. for 90 seconds is lower than 7%, especially lower than 5%, and the creep speed ($\epsilon$, sec$^{-1}$) between the point of 90 seconds and the point of 180 seconds is lower than $4\times 10^{-4}$ sec$^{-1}$, especially lower than $2\times 10^{-4}$ sec$^{-1}$ in case of a propylene copolymer or lower than $5\times 10^{-5}$ sec$^{-1}$ in case of a copolymer with an α-olefin having at least 4 carbon atoms.

Moreover, the molecularly oriented molded body of the ultra-molecular-weight ethylene/α-alpha-olefin copolymer according to the present invention is excellent in mechanical properties. For example, the molded body in the form of a drawn filament has an elastic modulus of at least 20 GPa, especially at least 30 GPa, and a tensile strength of at least 1.2 GPa, especially at least 1.5 GPa.

The ethylene/butene copolymer fiber and the ethylene/α-olefin (having at least 5 carbon atoms) copolymer fiber according to the present invention are characterized in that when a load slightly smaller than the breaking load is applied, the time (rupture time) which has elapsed before breaking is extremely long. Namely, these fibers are characterized in that when a load (F, MPa) of 750 to 1500 MPa is applied at room temperature, the rupture time (T, hours) satisifies the following requirement.

$$T \geqq 10^{\frac{1700 - F}{330}}.$$

The rupture time (T) of an ultra-high-molecular-weight homopolyethylene or an ethylene/propylene copolymer fiber is much shorter than the rupture time of the above-mentioned fibers.

The molecularly oriented molded body of the ultra-high-molecular-weight ethylene/α-olefin copolymer is excellent in the combination of heat resistance, creep resistance and mechanical properties, and by utilizing these characteristics, the molecularly oriented molded body of the present invention can be valuably used as industrial textile materials such as high-tenacity multifilaments, strings, ropes, woven fabrics and non-woven fabrics, and packaging materials such as packaging tapes.

When the molded body in the form of a filament is used as a reinforcing fiber for various resins such as epoxy resins and unsaturated polyesters and synthetic rubbers, it will be readily understood that the heat resistance and creep resistance are highly improved over those attained by a drawn filament of the conventional ultra-high-molecular-weight polyethylene. Furthermore, since this filament has a high strength and a low density, a high weight-reducing effect is advantageously attained, as compared with molded bodies formed by using conventional glass fibers, carbon fibers, boron fibers, aromatic polyamide fibers and aromatic polyimide fibers. As in case of composite materials formed by using glass fibers or the like, a composite material comprising the drawn filament of the present invention will be effectively used for the production of UD (unit directional) laminated boards, SMC (sheet molding compounds) and BMC (bulk molding compounds) and will be used in the fields where reduction of the weight and increase of the strength are required, for example, for the production of automobile parts, structural bodies such as boats and yachts and boards for electronic circuits.

The present invention will now be described in detail with reference to the following examples that by no means limit the scope of the invention.

EXAMPLE 1

Polymerization for Preparation of Ultra-High-Molecular-Weight Ethylene/Butene-1 Copolymer Slurry polymerization for formation of an ultra-high-molecular-weight ethylene/butene-1 copolymer was carried out in 1 l of n-decane as the polymerization solvent in the presence of a Ziegler catalyst. A monomer gas comprising ethylene and butene-1 at a molar ratio of 97.2/2.86 was continuously supplied to a reaction vessel so that the pressure was kept constant at 5 kg/cm$^2$. The polymerization was completed in 2 hours at 70° C. The amount of the obtained powdery ultra-high-molecular-weight ethylene/butene-1 copolymer was 145 g, the intrinsic viscosity (at 135° C. in decalin) of the copolymer was 7.25 dl/g, and the butene-1 content determined by an infrared spectrophotometer was 4.7 butene-1 molecules per 1000 carbon atoms.

Preparation of Drawn and Oriented Product of Ultra-High-Molecular-Weight Ethylene/Butene-1 Copolymer A mixture comprising 20 parts by weight of the powdery ultra-high-molecular-weight ethylene/butene-1 copolymer obtained by the above-mentioned polymerization and 80 parts by weight of a paraffin wax (melting point = 69° C., molecular weight = 490) was melt-spun under the following conditions.

To 100 parts by weight of the above-mentioned mixture was added 0.1 part by weight of 3,5-di-tert-butyl-4-hydroxy-toluene as the process stabilizer, and the mixture was melt-kneaded at a set temperature of 190° C. by using a screw type extruder (screw diameter = 25 mm, L/D = 25, supplied by Thermoplastics Co.). Subsequently, the molten mixture was melt-spun through a spinning die having an orifice diameter of 2 mm, which was attached to the extruder. The extruded melt was taken at a draft ratio of 36 at an air gap of 180 cm and cooled and solidified in the air to obtain an undrawn fiber.

The undrawn fiber was drawn under the following conditions.

Two-staged drawing was carried out by using three godet rolls. The heating medium in a first drawing tank was n-decane and the temperature was 110° C., and the heating medium in a second drawing tank was triethylene glycol and the temperature was 145° C. The effective length of each tank was 50 cm. The rotation speed of the first godet roll was adjusted to 0.5 m/min and an oriented fiber having a desired draw ratio was obtained by adjusting the rotation speed of the third godet roll. The rotation speed of the second godet roll was selected so that stable drawing was possible. Substantially all of the paraffin wax initially added was extracted in n-decane at the drawing step. The oriented fiber was then washed with water and dried a whole day and night, and the physical properties were determined. Incidentally, the draw ratio was calculated from the ratio of the rotation speed between the first and third godet rolls.

Measurement of Tensile Characteristics

The elastic modulus and tensile strength were measured at room temperature (23° C.) by using a tensile tester (Model DCS-50M supplied by Shimazu Seisakusho).

The sample length between clamps was 100 mm, and the pulling speed was 100 mm/min (the distortion speed was 100%/min). The elastic modulus was the initial elastic modulus calculated by using the gradient of the tangential line. The sectional area of the fiber necessary for the calculation was calculated from the weight on the assumption that the density was 0.96 g/cc.

Tensile Elastic Modulus and Strength Retention Ratios after Heat History

The heat history test was carried out by allowing the sample to stand still in a gear oven (perfect oven supplied by Tabai Seisakusho).

The sample having a length of about 3 m was wound repeatedly on a stainless steel frame having a plurality of blocks attached to both the ends thereof, and both the ends of the sample were fixed to such an extent that the sample did not slacken and no positive tension was imposed on the sample. After the heat history test, the tensile characteristics were determined according to the above-mentioned procedures.

Measurement of Creep Resistance

The creep characteristics were measured by using a thermal stress distortion measurement apparatus (Model TMA/SS10 supplied by Seiko Denshi Kogyo), and the sample length was 1 cm and the ambient temperature was 70° C. The measurement was conducted under an accelerated condition by imposing a load corresponding to 30% of the breaking load at room temperature on the sample. In order to evaluate the creep quantity quantitatively, the following two values were determined. Namely, the creep elongation CR$_{90}$ (%) after 90 seconds from the point of imposition of the load and the average creep speed (sec$^{-1}$) between the point of 90 seconds from the imposition of the load and the point of 180 seconds from the imposition of the load were determined.

The tensile characteristics of the obtained drawn and oriented fiber are shown in Table 1.

TABLE 1

| Sample | Sample 1 |
|---|---|
| Fineness (denier) | 9.1 |
| Draw ratio | 20 |
| Strength (GPa) | 1.87 |
| Elastic modulus (GPa) | 40.6 |
| Elongation (%) | 5.24 |

The endothermic characteristic curve of sample 1 at the first temperature elevation, determined by the differential scanning calorimeter, is shown in FIG. 2, and the endothermic characteristic curve at the second temperature elevation (second run) is shown in FIG. 5. The inherent crystal fusion peak of the drawn and oriented fiber (sample 1) of the ultra-high-molecular-weight ethylene/butene-1 copolymer appeared at 126.9° C., and the proportion of Tp to the total crystal fusion peak area was 33.7%. The creep resistance characteristics were such that CR$_{90}$ was 3.2% and epsilon was $3.03 \times 10^{-5}$ sec$^{-1}$. The creep characteristics of sample 1 are shown in FIG. 9. After the heat history at 170° C. for 5 minutes, the elastic modulus retention ratio was 101.2% and the strength retention ratio was 102.7%. Therefore, it was confirmed that the performances were not degraded by the heat history.

EXAMPLE 2

Polymerization for Preparation of Ultra-High-Molecular-Weight Ethylene/Butene-1

An ultra-high-molecular-weight ethylene/butene-1 copolymer was prepared by slurry polymerization using a Ziegler catalyst in 1 l of n-decane as the polymerization solvent. A monomer gas comprising ethylene and butene-1 at a molar ratio of 98.7/1.3 was continuously supplied to a reaction vessel so that the pressure was kept constant at 5 kg/cm². The polymerization was completed in 2 hours at 70° C. The amount of the obtained powdery ultra-high-molecular-weight ethylene/butene-1 copolymer was 179 g, and the intrinsic viscosity ($\eta$) was 9.4 dl/g (at 135° C. in decalin) and the butene-1 content determined by an infrared spectrophotometer was 1.5 butene-1 molecules per 1000 carbon atoms.

Preparation and Physical Properties of Drawn and Oriented Product of Ultra-High-Molecular-Weight Ethylene/Butene-1 Copolymer A drawn and oriented fiber of the ultra-high-molecular-weight ethylene/butene-1 copolymer was prepared by using the powdery ultra-high-molecular-weight copolymer obtained by the above-mentioned polymerization in the same manner as described in Example 1. The tensile characteristics of the obtained drawn and oriented fiber are shown in Table 2.

TABLE 2

| Sample | Sample 2 |
| --- | --- |
| Fineness (denier) | 11.4 |
| Draw ratio | 20 |
| Strength (GPa) | 2.21 |
| Elastic modulus (GPa) | 57.3 |
| Elongation (%) | 4.50 |

Figure 6:
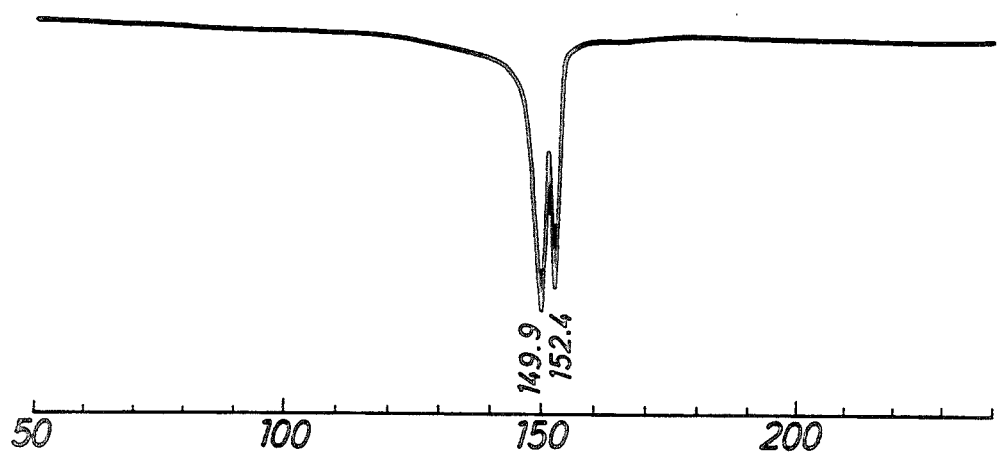
FIG. 6 shows an endothermic characteristic curve of a drawn and oriented fiber of an ultra-high-molecular-weight ethylene/butene-1 copolymer obtained in Example 2, determined by a differential scanning calorimeter in the restraint state.
Figure 7:
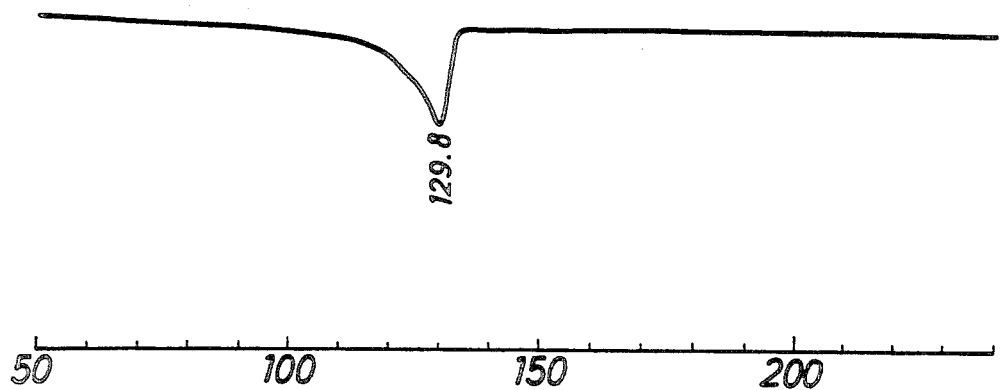
FIG. 7 shows an endothermic characteristic curve obtained when the sample shown in FIG. 6 is subjected to the second temperature elevation measurement.

The endothermic characteristic curve of sample 2 of the drawn and oriented fiber of the ultra-high-molecular-weight copolymer at the first temperature elevation, determined by the differential scanning calorimeter, is shown in FIG. 6, and the endothermic characteristic at the second temperature elevation (second run) is shown in FIG. 7. The inherent crystal fusion peak temperature of the drawn and oriented fiber (sample 2) of the ultra-high-molecular-weight ethylene/butene-1 copolymer was 129.8° C. and the proportion of Tp to the total crystal fusion peak area was 38.9%.

The creep resistance characteristics were such that $CR_{90}$ was 1.29% and epsilon was $1.21 \times 10^{-5}$ sec$^{-1}$. The creep characteristics of sample 2 are shown in FIG. 9. After the heat history at 170° C. for 5 minutes, the elastic modulus retention ratio was 100.3% and the strength retention ratio was 103.0%. Accordingly, it was confirmed that the performances were not degraded by the heat history.

COMPARATIVE EXAMPLE 1

A mixture comprising 20 parts by weight of powdery ultra-high-molecular-weight polyethylene (homopolymer) (the intrinsic viscosity ($\eta$) was 7.42 dl/g at 135° C. in decalin) and 80 parts by weight of a paraffin wax (the melting point was 69° C. and the molecular weight was 490) was melt-spun and drawn in the same manner as described in Example 1. The tensile characteristics of the obtained drawn and oriented fiber are shown in Table 3.

TABLE 3

| Sample | Sample 3 |
| --- | --- |
| Fineness (denier) | 9.3 |
| Draw ratio | 25 |
| Strength (GPa) | 2.53 |
| Elastic modulus (GPa) | 71.5 |
| Elongation (%) | 4.31 |

Figure 8:
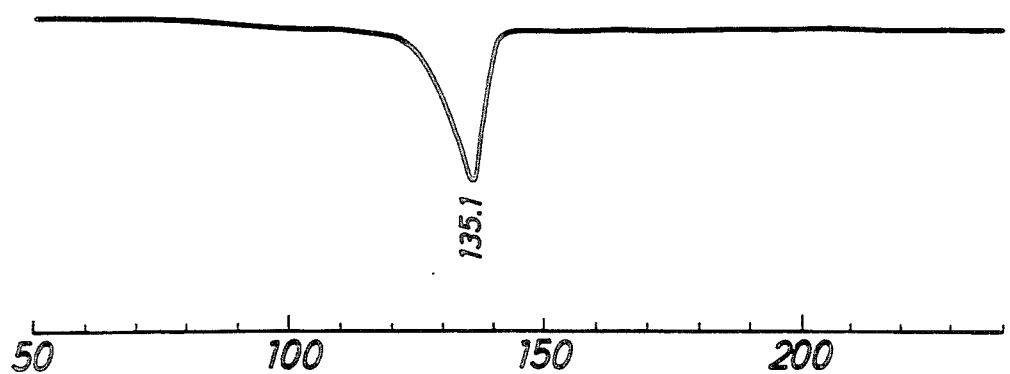
FIG. 8 shows an endothermic characteristic curve obtained when the sample shown in FIG. 4 is subjected to the second temperature elevation measurement.

The endothermic characteristic curve of the drawn and oriented fiber (sample 3) of the ultra-high-molecular-weight polyethylene at the first temperature elevation, determined by the differential scanning calorimeter, is shown in FIG. 4, and the endothermic characteristic curve at the second temperature elevation (second run) is shown in FIG. 8. The inherent crystal fusion peak temperature of the ultra-high-molecular-weight polyethylene of sample 3 was 135.1° C. and the proportion of Tp to the total crystal fusion peak area was 8.8%. The proportion of the high-temperature peak Tp1 to the total crystal fusion peak area was 1.0%. The creep resistance characteristics were such that $CR_{90}$ was 12.0% and $\epsilon$ was $1.07 \times 10^{-3}$ sec$^{-1}$. The creep characteristics of sample 3 are shown in FIG. 9 together with those of samples 1 and 2. After the heat history at 170° C. for 5 minutes, the elastic modulus retention ratio was 80.4% and the strength retention ratio was 79.2%. It was confirmed that the elastic modulus and strength were degraded by the heat history.

EXAMPLE 3

Polymerization for Preparation of Ultra-High-Molecular-Weight Ethylene/Propylene Copolymer An ethylene/propylene copolymer was prepared by slurry polymerization using a Ziegler catalyst in 1 l of n-decane. A monomer gas comprising ethylene and propylene at a molar ratio of 98.2/1.84 was continuously supplied to a reaction vessel so that the pressure was kept constant at 5 kg/cm². The polymerization was completed in 2 hours at 70° C. The amount of the obtained powdery ultra-high-molecular-weight ethylene/propylene copolymer was 171 g, and the intrinsic viscosity ($\eta$) (at 135° C. in decalin) was 7.65 dl/g and the propylene content determined by the infrared spectrophotometer was 6.7 propylene molecules per 1000 carbon atoms.

Preparation of Drawn and Oriented Product of Ultra-High-Molecular-Weight Ethylene/Propylene Copolymer A mixture comprising 20 parts by weight of the above-mentioned powdery ultra-high-molecular-weight ethylene/propylene copolymer and 80 parts by weight of a paraffin wax (the melting point was 69° C. and the molecular weight was 490 g/mole) was melt-spun under the following conditions.

Namely, an undrawn fiber was prepared in the same manner as described in Example 1 except that the set temperature of the extruder was changed to 175° C. at the melt-kneading step and the draft ratio was changed to 38. The undrawn fiber was drawn in the same manner as described in Example 1.

The tensile characteristics of the obtained drawn and oriented fiber are shown in Table 4.

TABLE 4

| Sample | Sample 4 |
| --- | --- |
| Fineness (denier) | 5.6 |

TABLE 4-continued

| | |
|---|---|
| Draw ratio | 35 |
| Strength (GPa) | 1.71 |
| Elastic modulus (GPa) | 46.6 |
| Elongation (%) | 4.74 |

Figure 11:
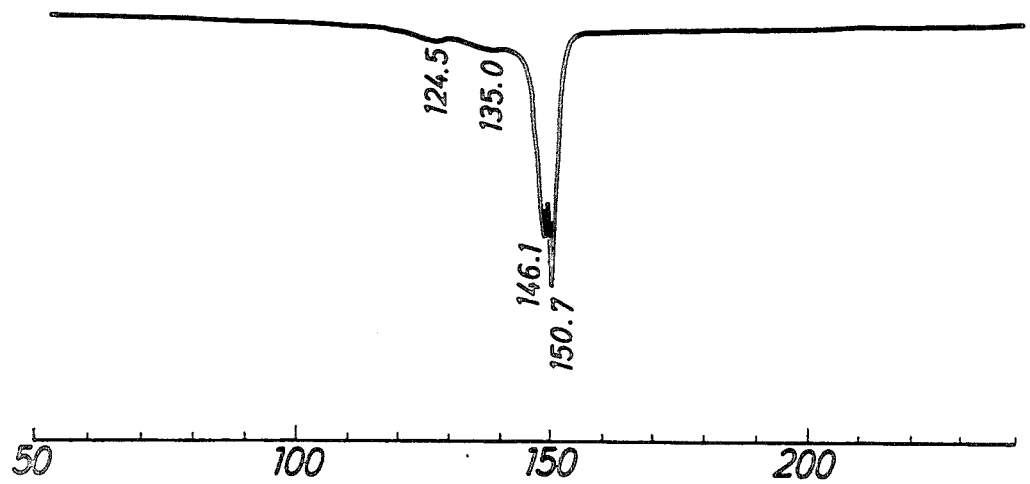
FIG. 11 shows an endothermic characteristic curve of a drawn and oriented fiber of the ultra-high-molecular-weight ethylene/propylene copolymer obtained in Example 3, determined by a differential scanning calorimeter in the restraint state.
Figure 12:
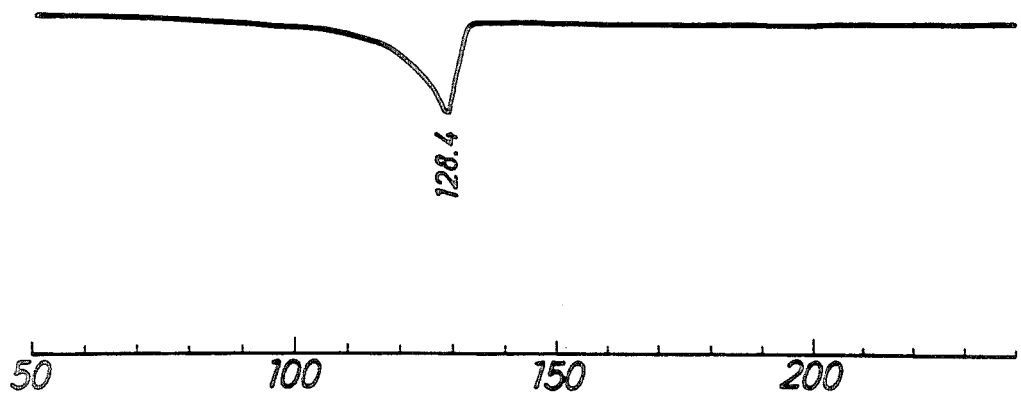
FIG. 12 shows an endothermic characteristic curve obtained when the sample shown in FIG. 11 is subjected to the second temperature elevation measurement (second run).

The endothermic characteristic curve of sample 4 at the first temperature elevation, determined by the differential scanning calorimeter, is shown in FIG. 11, and the endothermic characteristic curve at the second temperature elevation (second run) is shown in FIG. 12.

Figure 15:
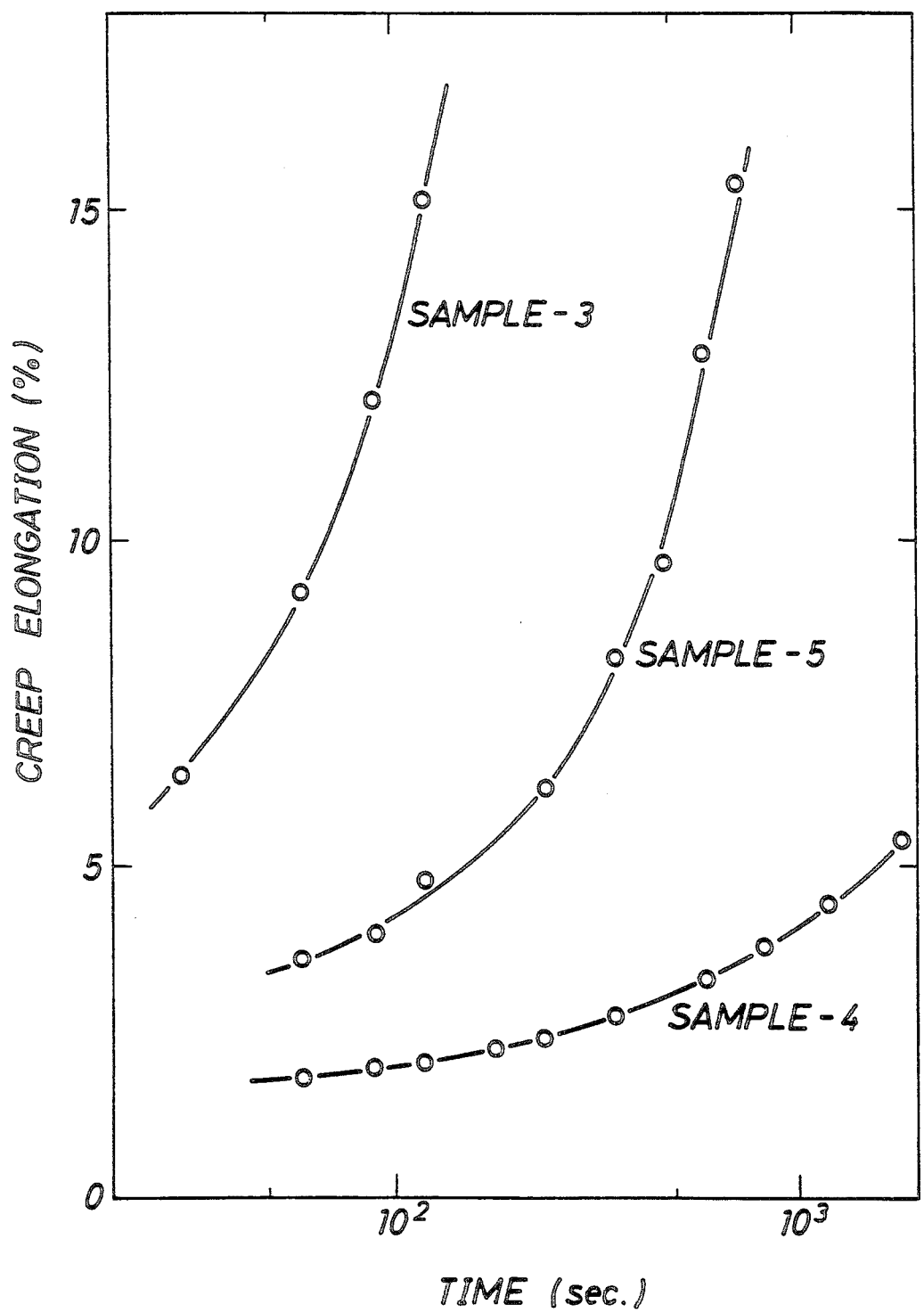
FIG. 15 shows creep characteristic curves of the drawn and oriented fibers of the polymers obtained in Example 3, Example 4 and Comparative Example 1.

The inherent crystal fusion peak appeared at 128.4° C. and the proportion of Tp to the total crystal fusion peak area was 49.0%. The creep resistance characteristics were such that $CR_{90}$ was 4.6% and $\epsilon$ was $3.33 \times 10^{-5}$ sec$^{-1}$. The creep characteristics of sample 4 are shown in FIG. 15. After the heat history at 170° C. for 5 minutes, the elastic modulus retention ratio was 104.5% and the strength retention ratio was 108.2%. It was confirmed that the performances were not reduced by the heat history.

EXAMPLE 4

Polymerization for Preparation of Ultra-High-Molecular-Weight Ethylene/Propylene Copolymer In the same manner as described in Example 3, the slurry polymerization for formation of an ethylene/propylene copolymer was carried out in the presence of a Ziegler catalyst in 1 l of n-decane as the polymerization solvent. A monomer gas comprising ethylene and propylene at a molar ratio of 99.5/0.5 was continuously supplied to a reaction vessel so that the pressure was kept constant at 5 kg/cm$^2$. The polymerization was completed in 3 hours at 70° C. The amount of the obtained powdery ultra-high-molecular-weight ethylene/propylene copolymer was 146 g, and the intrinsic viscosity ($\eta$) (in decalin at 135° C.) was 10.4 dl/g and the propylene content determined by the infrared spectrophotometer was 1.4 propylene molecules per 1000 carbon atoms.

Preparation of Drawn and Oriented Product of Ultra-High-Molecular-Weight Ethylene/Propylene Copolymer By using the powdery ultra-high-molecular-weight ethylene/propylene copolymer obtained by the above-mentioned polymerization, a drawn and oriented fiber was prepared in the same manner as described in Example 3 except that the set temperature at the melt-spinning step was 190° C. and the draft ratio at the spinning step was 35.

The tensile characteristics of the drawn and oriented fiber are shown in Table 5.

TABLE 5

| Sample | Sample 5 |
|---|---|
| Fineness (denier) | 6.8 |
| Draw ratio | 32 |
| Strength (GPa) | 2.9 |
| Elastic modulus (GPa) | 75.5 |
| Elongation (%) | 4.5 |

Figure 13:
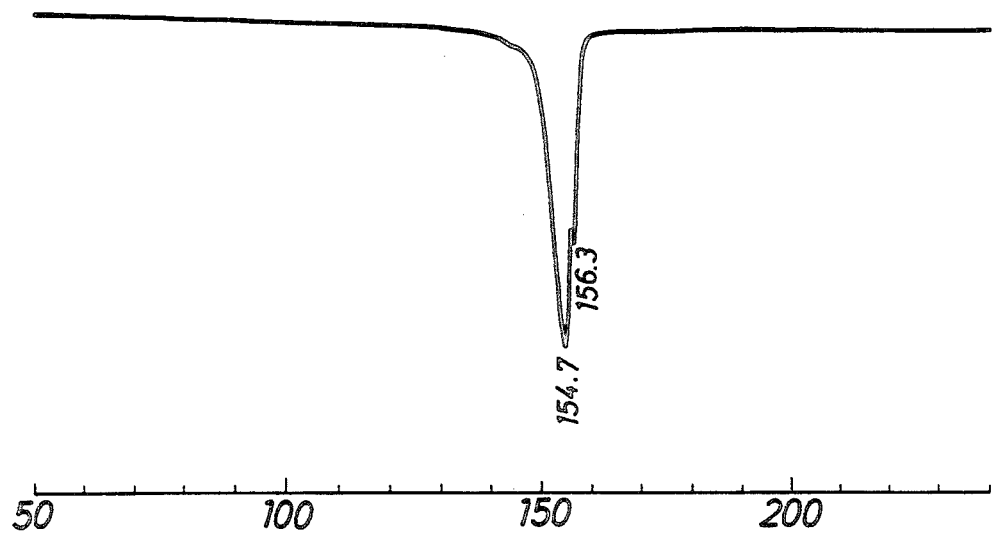
FIG. 13 shows an endothermic characteristic curve of a drawn and oriented fiber of an ultra-high-molecular-weight ethylene/propylene copolymer obtained in Example 4, determined by a differential scanning calorimeter in the restraint state.
Figure 14:
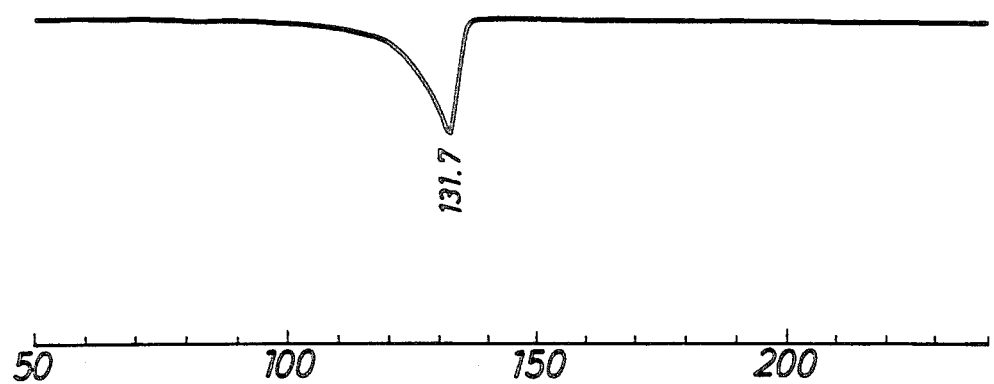
FIG. 14 shows an endothermic characteristic curve obtained when the sample shown in FIG. 13 is subjected to the second temperature elevation.

The endothermic characteristic curve of sample 5 at the first temperature elevation (first run), determined by the differential scanning calorimeter, is shown in FIG. 13, and the endothermic characteristic curve at the second temperature elevation (second run) is shown in FIG. 14. The inherent crystal fusion peak of the ultra-high-molecular-weight ethylene/propylene copolymer of sample 5 appeared at 131.7° C., and the proportion of Tp to the total crystal fusion peak area was 57.4%. The creep resistance characteristics were such that $CR_{90}$ was 4.0% and $\epsilon$ was $1.44 \times 10^{-4}$ sec$^{-1}$. The creep characteristics of sample 5 are shown in FIG. 15. After the heat history at 170° C. for 5 minutes, the elastic modulus retention ratio was 104.4% and the strength retention ratio was 107.9%. It was confirmed that the performances were not degraded by the heat history, as in Example 3.

EXAMPLE 5

Polymerization for Preparation of Ultra-High-Molecular-Weight Ethylene/4-Methylpentene-1 Copolymer Slurry polymerization of ethylene was carried out in 1 l of n-decane as the polymerization solvent by using a Ziegler catalyst. At the start of the polymerization, 25 ml of 4-methylpentene-1 as the comonomer and 30 Nml of hydrogen as the molecular weight-adjusting agent were collectively added. Ethylene gas was continuously supplied to a reaction vessel so that the pressure in the reaction vessel was kept constant at 5 kg/cm$^2$. The polymerization was completed in 1.5 hours at 70° C. The amount of the obtained powdery ultra-high-molecular-weight ethylene/4-methylpentene-1 copolymer was 264 g, and the intrinsic viscosity ($\eta$) (at 135° C. in decalin) was 9.66 dl/g and the 4-methylpentene-1 content was 1.7 4-methylpentene-1 molecules per 1000 carbon atoms.

Preparation of Drawn and Oriented Product of Ultra-High-Molecular-Weight Ethylene/4-Methylpentene-1 Copolymer A mixture comprising 20 parts by weight of the above-mentioned ultra-high-molecular-weight ethylene/4-methylpentene-1 copolymer and 80 parts by weight of a paraffin wax (the melting point was 69° C. and the molecular weight was 490) was melt-spun and drawn under the same conditions as described in Example 1.

The tensile characteristics of the drawn and oriented fiber are shown in Table 6.

TABLE 6

| Sample | Sample 6 |
|---|---|
| Fineness (denier) | 7.9 |
| Draw ratio | 25 |
| Strength (GPa) | 2.06 |
| Elastic modulus (GPa) | 46.7 |
| Elongation (%) | 5.26 |

Figure 17:
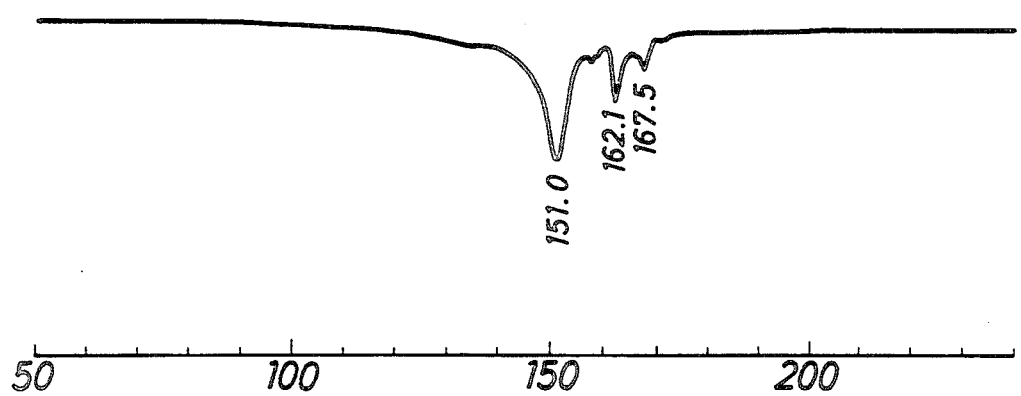
FIG. 17 shows an endothermic characteristic curve of a drawn and oriented fiber of the ultra-high-molecular-weight ethylene/4-methylpentene-1 copolymer obtained in Example 5, determined by a differential scanning calorimeter in the restraint state.
Figure 18:
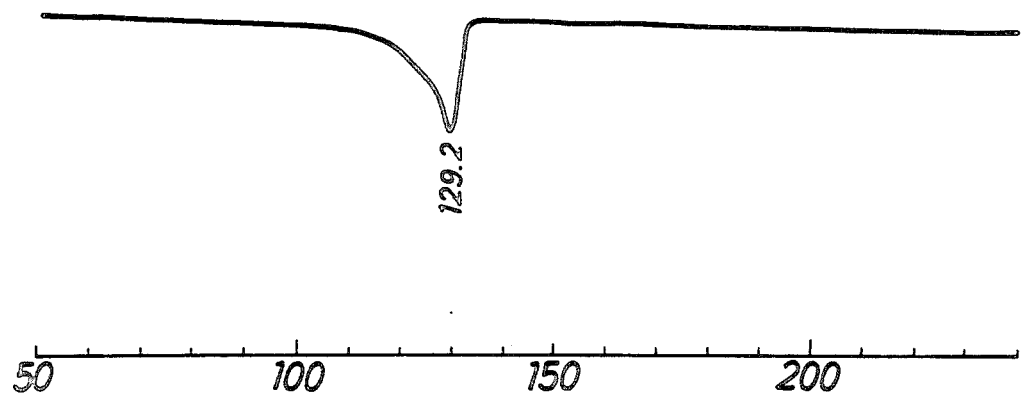
FIG. 18 shows an endothermic characteristic curve obtained when the sample shown in FIG. 17 is subjected to the second temperature elevation measurement (second run).

The endothermic characteristic curve of sample 6 at the first temperature elevation, determined by the differential scanning calorimeter, is shown in FIG. 17, and the endothermic characteristic curve at the second temperature elevation (second run) is shown in FIG. 18. The inherent crystal fusion peak of sample 6 appeared at 129.2° C., and the proportions Tp and Tp1 of sample 6 to the total crystal fusion peak area were 57.1% and 13.3%, respectively. The creep resistance characteristics were such that $CR_{90}$ was 4.9% and $\epsilon$ was $3.33 \times 10^{-5}$ sec$^{-1}$. After the heat history at 170° C. for 5 minutes, the elastic modulus retention ratio was 121.8% and the strength retention ratio was 97.1%. Although the strength was slightly reduced by the heat history, the elastic modulus was improved by the heat history.

EXAMPLE 6

Polymerization for Preparation of Ultra-High-Molecular-Weight Ethylene/4-Methylpentene-1 Copolymer Slurry polymerization was carried out in the presence of a Ziegler catalyst in 1 l of n-decane as the polymerization solvent. At the start of the polymerization, 50 ml of 4-methylpentene-1 as the comonomer and 50 Nml of hydrogen as the molecular weight-adjusting agent were collectively added. Ethylene gas was continuously supplied to a reaction vessel so that the pressure in the reaction vessel was kept constant at 5 kg/cm$^2$, and the polymerization was completed in 1.5 hours at 70° C. The amount of the obtained powdery ultra-high-molecular-weight ethylene/4-methylpentene-1 copolymer was 172 g, and the intrinsic viscosity ($\eta$) (at 135° C. in decalin) was 10.55 dl/g and the 4-methylpentene-1 content, determined by the infrared spectrophotometer, was 0.2 4-methylpentene-1 molecule per 1000 carbon atoms.

Preparation and Physical Properties of Drawn and Oriented Product of Ultra-High-Molecular-Weight Ethylene/4-Methylpentene-1 Copolymer A drawn and oriented fiber was prepared from the so-obtained ethylene/4-methylpentene-1 copolymer in the same manner as described in Example 5.

The tensile characteristics of the obtained drawn and oriented fiber are shown in Table 7.

TABLE 7

| Sample | Sample 7 |
|---|---|
| Fineness (denier) | 14.6 |
| Draw ratio | 16 |
| Strength (GPa) | 2.19 |
| Elastic modulus (GPa) | 53.6 |
| Elongation (%) | 4.5 |

Figure 19:
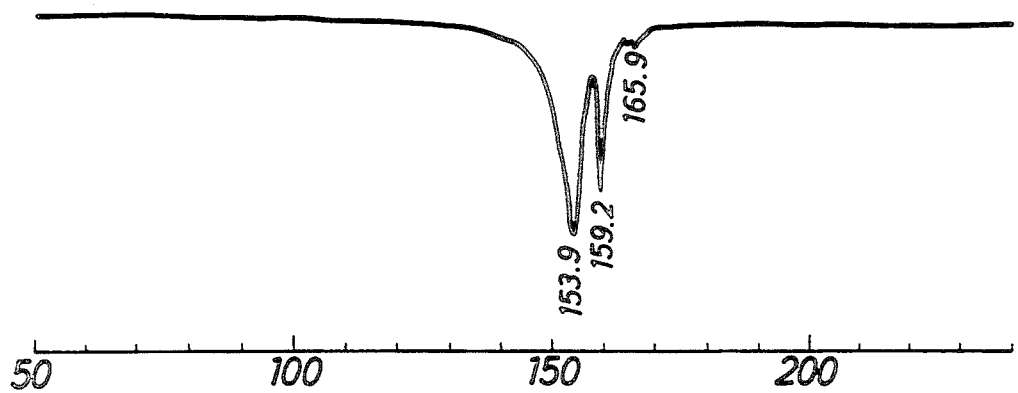
FIG. 19 shows an endothermic characteristic curve of a drawn and oriented fiber of an ultra-high-molecular-weight ethylene/4-methylpentene-1 copolymer obtained in Example 6, determined by a differential scanning calorimeter in the restraint state.
Figure 20:
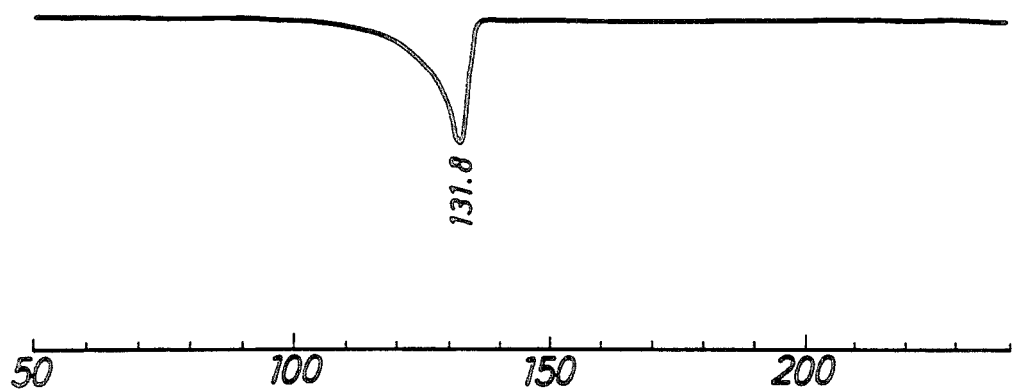
FIG. 20 shows an endothermic characteristic curve obtained when the sample shown in FIG. 19 is subjected to the second temperature elevation measurement.

The endothermic characteristic cure of sample 7 at the first temperature elevation, determined by the differential scanning calorimeter, is shown in FIG. 19, and the endothermic characteristic curve at the second temperature elevation (second run) is shown in FIG. 20. The inherent crystal fusion peak of sample 7 appeared at 131.3° C., and the proportions of Tp and Tp1 of sample 7 to the total crystal fusion peak area were 93.8% and 3.8%, respectively. The creep resistance characteristics were such that CR$_{90}$ was 2.46% and $\epsilon$ was $1.21 \times 10^{-5}$ sec$^{-1}$.

Figure 27:
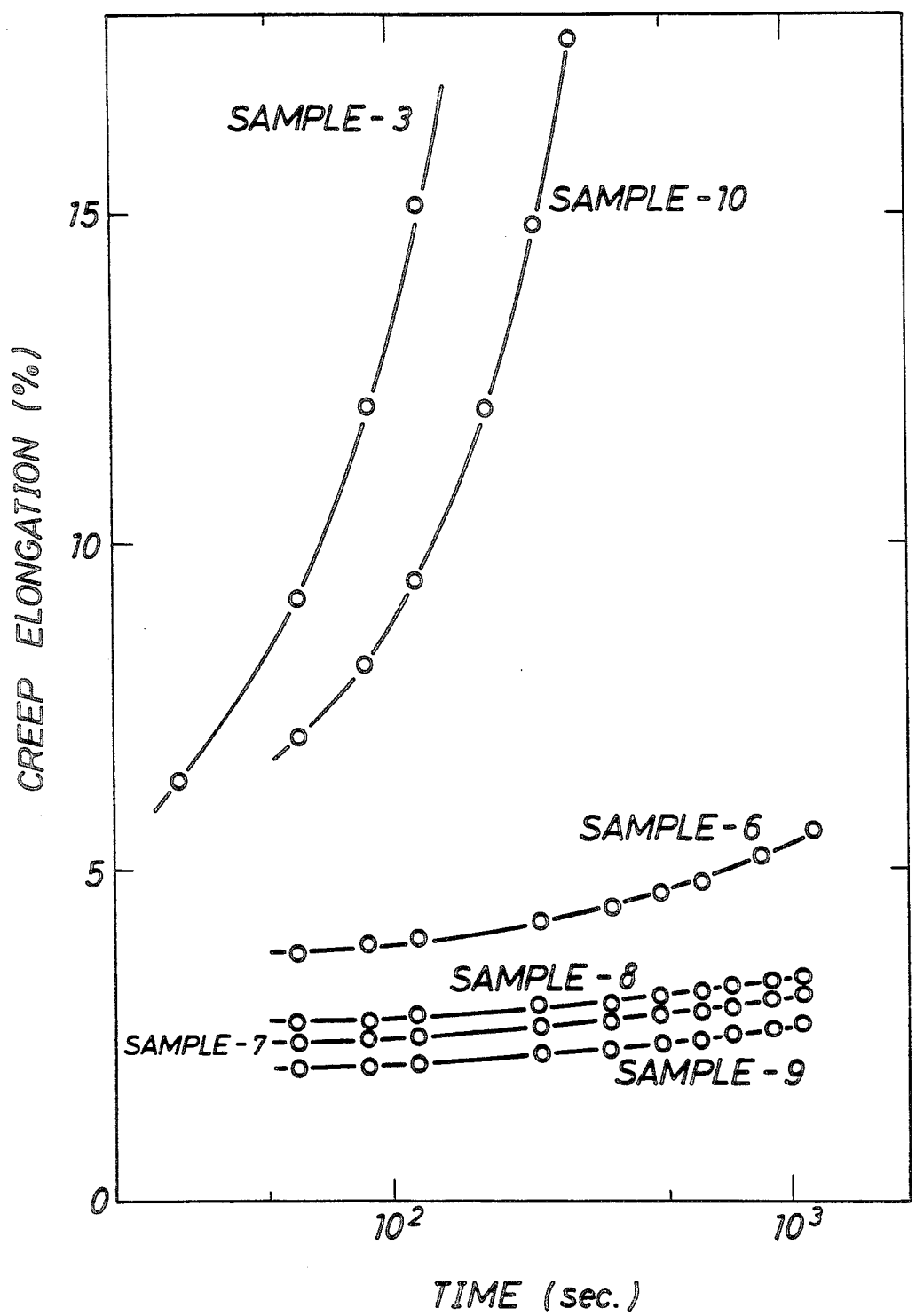
FIG. 27 shows creep characteristic curves of the drawn and oriented fibers of the polymers obtained in Example 5, Example 6, Example 7, Example 8, Comparative Example 1 and Comparative Example 2.

The creep characteristics of sample 7 are shown in FIG. 27. After the heat history at 170° C. for 5 minutes, the elastic modulus retention ratio was 108.3% and the strength retention ratio was 96.3%. It was confirmed that although the strength was slightly reduced by the heat history, the elastic modulus was improved by the heat history.

EXAMPLE 7

Polymerization for Preparation of Ultra-High-Molecular-Weight Ethylene/Hexene-1 Copolymer Slurry polymerization of ethylene was carried out in the presence of a Ziegler catalyst in 1 l of n-decane as the polymerization solvent. At the start of the polymerization, 25 ml of hexene-1 as the comonomer and 40 Nml of hydrogen as the molecular weight-adjusting agent were collectively added. Ethylene gas was continuously supplied to a reaction vessel so that the pressure in the reaction vessel was kept constant at 5 kg/cm$^2$. The polymerization was completed in 1.5 hours at 70° C. The amount of the obtained powdery ultra-high-molecular-weight ethylene/hexene-1 copolymer was 231 g, and the intrinsic viscosity ($\eta$) (at 135° C. in decalin) was 9.37 d/g and the hexene-1 content determined by the infrared spectrophotometer was 2.3 hexene-1 molecules per 1000 carbon atoms.

Preparation and Physical Properties of Ultra-High-Molecular-Weight Ethylene/Hexene-1 Copolymer A drawn and oriented fiber was prepared from the so-obtained ethylene/hexene-1 copolymer in the same manner as described in Example 5. The tensile characteristics of the obtained drawn and oriented fiber are shown in Table 8.

TABLE 8

| Sample | Sample 8 |
|---|---|
| Fineness (denier) | 13.7 |
| Draw ratio | 14 |
| Strength (GPa) | 1.89 |
| Elastic modulus (GPa) | 42.4 |
| Elongation (%) | 5.21 |

Figure 21:
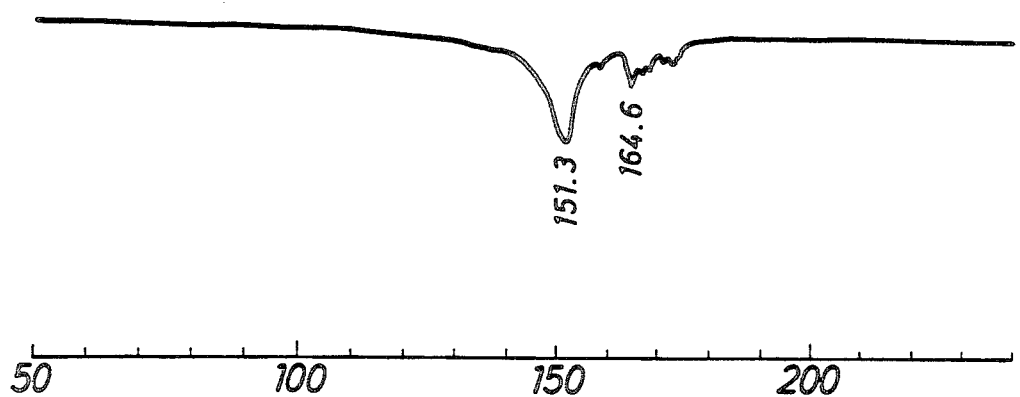
FIG. 21 shows an endothermic characteristic curve of a drawn and oriented fiber of an ultra-high-molecular-weight ethylene/hexene-1 copolymer obtained in Example 7, determined by a differential scanning calorimeter in the restraint state.
Figure 22:
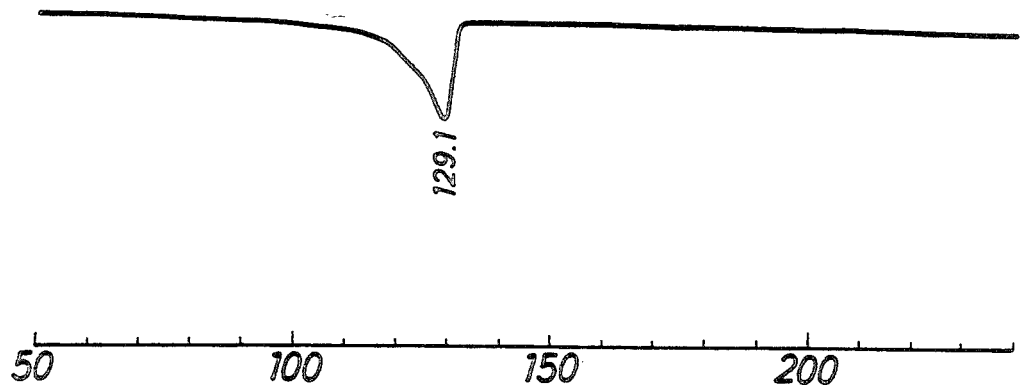
FIG. 22 shows an endothermic characteristic curve obtained when the sample shown in FIG. 21 is subjected to the second temperature elevation measurement.

The endothermic characteristic curve of sample 8 at the first temperature elevation, determined by the differential scanning calorimeter, is shown in FIG. 21, and the endothermic characteristic curve at the second temperature elevation (second run) is shown in FIG. 22. The inherent crystal fusion peak of sample 8 appeared at 129.1° C., and the proportions of Tp and Tp1 of sample 8 to the total crystal fusion peak area were 89.1% and 16%, respectively. The creep resistance characteristics of sample 8 were such that CR$_{90}$ was 2.56% and $\epsilon$ was $1.21 \times 10^{-5}$ sec$^{-1}$. The creep characteristics of sample 8 are shown in Table 27. After the heat history at 170° C. for 5 minutes, the elastic modulus retention ratio was 102.0% and the strength retention ratio was 99.5%.

EXAMPLE 8

Polymerization for Preparation of Ultra-High-Molecular-Weight Ethylene/Octene-1 Copolymer Slurry polymerization of ethylene was carried out in the presence of a Ziegler catalyst in 1 l of n-decane as the polymerization solvent. At the start of the polymerization, 125 ml of octene-1 as the comonomer and 40 Nml of hydrogen at the molecular weight-adjusting agent were collectively added. Ethylene gas was continuously supplied to a reaction vessel so that the pressure in the reaction vessel was kept constant at 5 kg/cm$^2$. The polymerization was completed in 2 hours at 70° C. The amount of the obtained powdery ultra-high-molecular-weight ethylene/octene-1 copolymer was 178 g, and the intrinsic viscosity ($\eta$) (at 135° C. in decalin) was 10.66 dl/g and the octene-1 content, determined by the infrared spectrophotometer, was 0.5 octene-1 molecule per 1000 carbon atoms.

Preparation and Physical Properties of Drawn and Oriented Product of Ultra-High-Molecular-Weight Ethylene/Octene-1 Copolymer A drawn and oriented fiber was prepared from the so-obtained ethylene/octene-1 copolymer in the same manner as described in Example 5. The tensile characteristics of the obtained drawn and oriented fiber are shown in Table 9.

TABLE 9

| Sample | Sample 9 |
| --- | --- |
| Fineness (denier) | 11.1 |
| Draw ratio | 16 |
| Strength (GPa) | 2.18 |
| Tensile modulus (GPa) | 65.7 |
| Elongation (%) | 3.68 |

Figure 23:
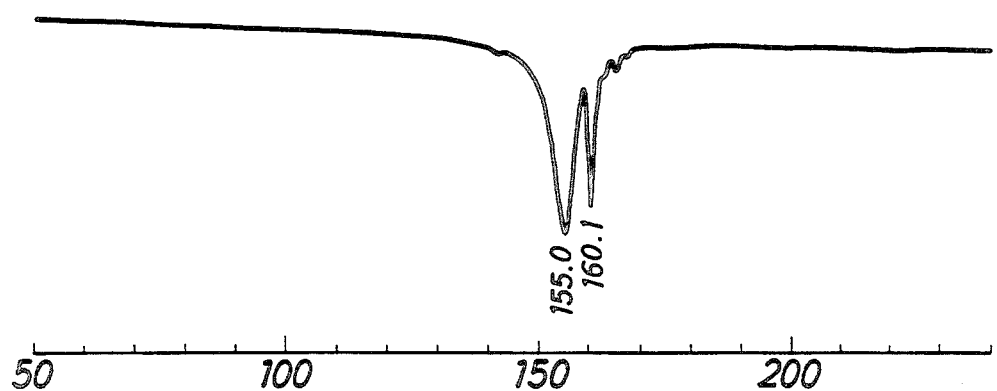
FIG. 23 shows an endothermic characteristic curve of a drawn and oriented fiber of an ultra-high-molecular-weight ethylene/octene-1 copolymer obtained in Example 8, determined by a differential scanning calorimeter in the restraint state.
Figure 24:
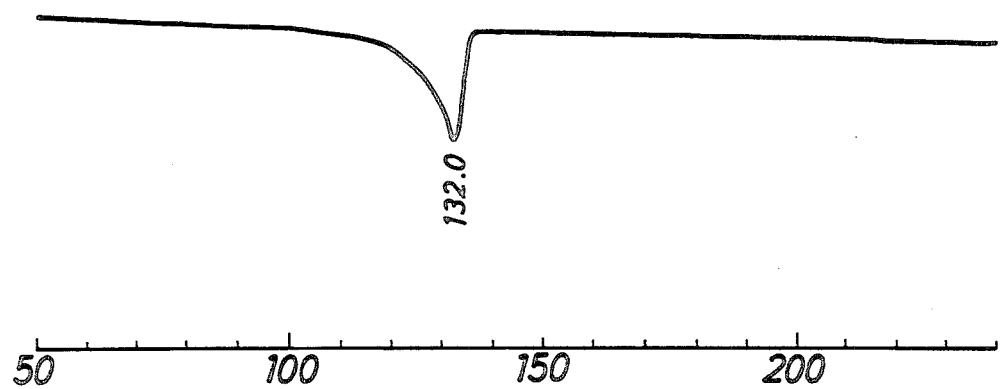
FIG. 24 shows an endothermic characteristic curve obtained when the sample shown in FIG. 23 is subjected to the second temperature elevation measurement.

The endothermic characteristic curve of sample 9 at the first temperature elevation, determined by the differential scanning calorimeter, is shown in FIG. 23, and the endothermic characteristic curve at the second temperature elevation (second run) is shown in FIG. 24. The inherent crystal fusion peak of sample 9 appeared at 132° C., and the proportions of Tp and Tp1 of sample 9 to the total crystal fusion peak area were 97.7% and 5.0%, respectively. The creep resistance characteristics of sample 9 were such that $CR_{90}$ was 2.01% and $\epsilon$ was $9.52 \times 10^{-6} sec^{-1}$. The creep characteristics of sample 9 are shown in FIG. 27. After the heat history at 170° C. for 5 minutes, the elastic modulus retention ratio was 109.2% and the strength retention ratio was 101.9%. It was confirmed that both of the elastic modulus and strength were improved by the heat history.

COMPARATIVE EXAMPLE 2

A mixture comprising 20 parts by weight of powdery ultra-high-molecular-weight polyethylene (homopolymer) (the intrinsic viscosity ($\eta$) was 10.2 d/g at 135° C. in decalin) and 80 parts by weight of a paraffin wax (the melting point was 69° C. and the molecular weight was 490) was melt-spun and drawn in the same manner as described in Example 1. The tensile characteristics of the obtained drawn and oriented fiber are shown in Table 10.

TABLE 10

| Sample | Sample 10 |
| --- | --- |
| Fineness (denier) | 6.0 |
| Draw ratio | 25 |
| Strength (GPa) | 3.18 |
| Elastic modulus (GPa) | 78.2 |
| Elongation (%) | 5.78 |

Figure 25:
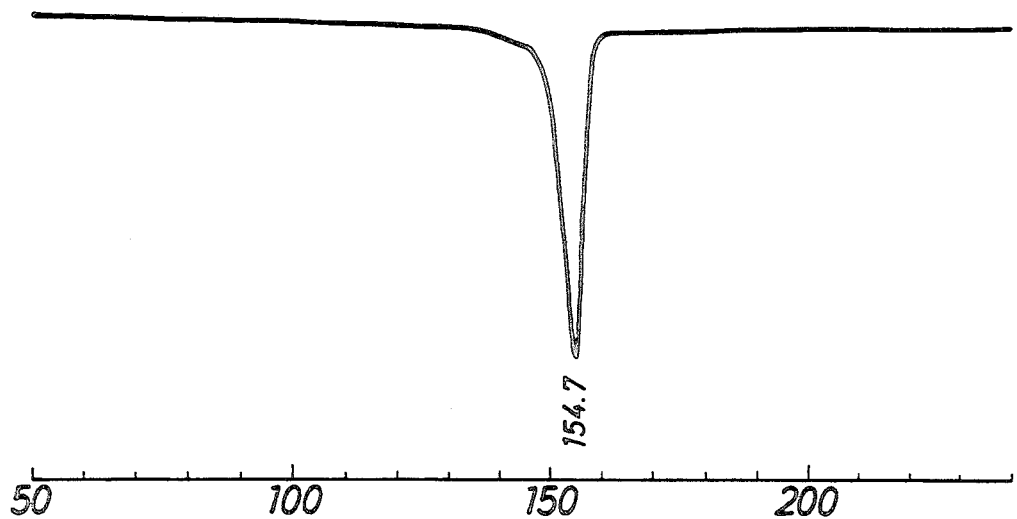
FIG. 25 shows an endothermic characteristic curve of a drawn and oriented fiber of ultra-high-molecular-weight polyethylene obtained in Comparative Example 2.
Figure 26:
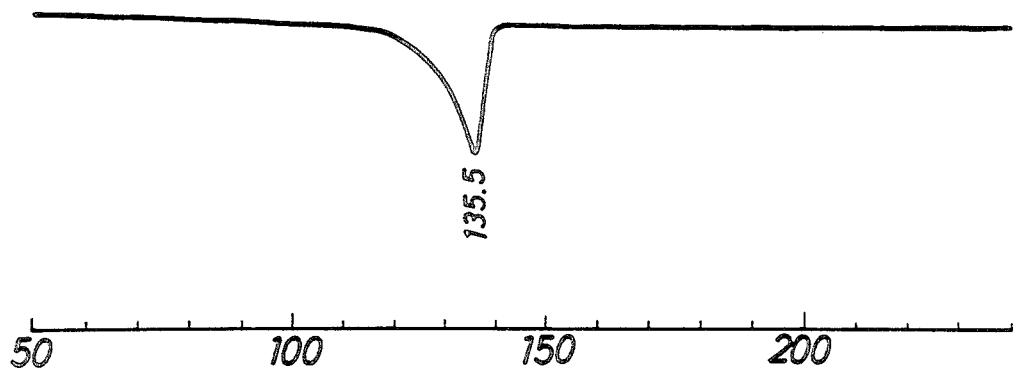
FIG. 26 is an endothermic characteristic curve obtained when the sample shown in FIG. 25 is subjected to the second temperature elevation measurement.

The endothermic characteristic curve of the ultra-high-molecular-weight polyethylene drawn and oriented fiber of sample 10 at the first temperature elevation, determined by the differential scanning calorimeter, is shown in FIG. 25, and the endothermic characteristic curve at the second temperature elevation (second run) is shown in FIG. 26. The inherent crystal fusion peak of the ultra-high-molecular-weight polyethylene fiber of sample 10 appeared at 135.5° C., and the proportions of Tp and Tp1 to the total crystal fusion peak area were 13.8% and 1.1%, respectively. The creep resistance characteristics of sample 10 were such that $CR_{90}$ was 8.2% and $\epsilon$ was $4.17 \times 10^{-4} sec^{-1}$. The creep characteristics of sample 10 are shown in FIG. 27. After the heat history at 170° C. for 5 minutes, the elastic modulus retention ratio was 86.1% and the strength retention ratio was 93.1%. The elastic modulus was drastically degraded by the heat history.

EXAMPLE 9

Polymerization for Preparation of Ultra-High-Molecular-Weight Ethylene/Propylene/4-Methylpentene-1 Copolymer Slurry polymerization for the preparation of an ethylene/propylene/4-methylpentene-1 copolymer was carried out in the presence of a Ziegler catalyst in 1 l of n-decane as the polymerization solvent. Prior to initiation of the polymerization, 10 ml of 4-methylpentene-1 as the comonomer and 40 Nm of hydrogen gas as the molecular weight-adjusting agent were collectively added. Ethylene gas containing 1.62 mole % of propylene was continuously supplied to a reaction vessel so that the pressure in the reaction vessel was kept constant at 5 kg/cm². The polymerization was completed in 2 hours at 70° C. The amount of the obtained powdery ultra-high-molecular-weight ethylene/propylene/4-methylpentene-1 copolymer was 284 g, and the intrinsic viscosity ($\eta$) (at 135° C. in decalin) was 8.01 dl/g and the total content of propylene and 4-methylpentene-1, determined by the infrared spectrophotometer, was 5.1 comonomer molecules per 1000 carbon atoms.

Preparation of Drawn and Oriented Product of Ultra-High-Molecular-Weight Ethylene/Propylene/4-Methylpentene-1 Copolymer A mixture comprising 20 parts by weight of the above-mentioned powdery ultra-high-molecular-weight ethylene/propylene/4-methylpentene-1 copolymer and 80 parts by weight of a paraffin wax (the melting point was 69° C. and the molecular weight was 490 g/mole) was melt-spun and drawn under the same conditions as described in Example 4.

The tensile characteristics of the obtained drawn and oriented fiber are shown in Table 11.

TABLE 11

| Sample | Sample 11 |
| --- | --- |
| Fineness (denier) | 6.8 |
| Draw ratio | 24 |
| Strength (GPa) | 2.22 |
| Elastic modulus (GPa) | 53.5 |
| Elongation (%) | 4.81 |

Figure 29:
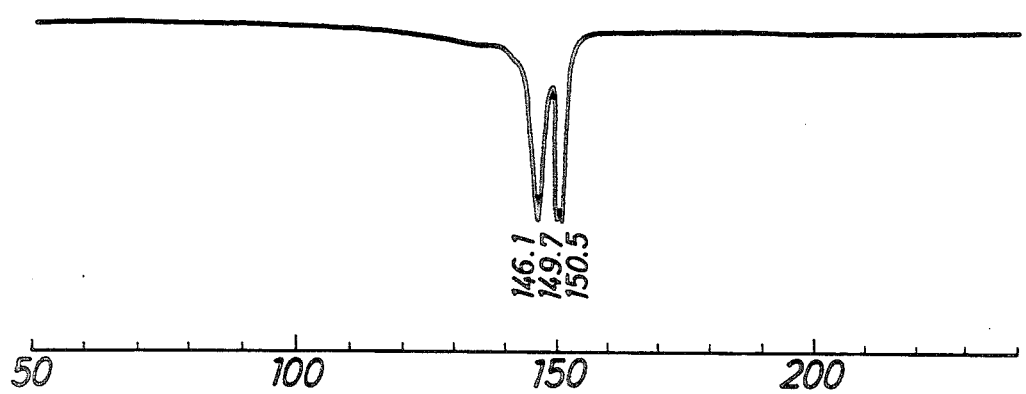
FIG. 29 shows an endothermic characteristic curve of a drawn and oriented fiber of the ultra-high-molecular-weight ethylene/propylene/4-methylpentene-1 copolymer obtained in Example 9, determined by a differential scanning calorimeter in the restraint state.
Figure 30:
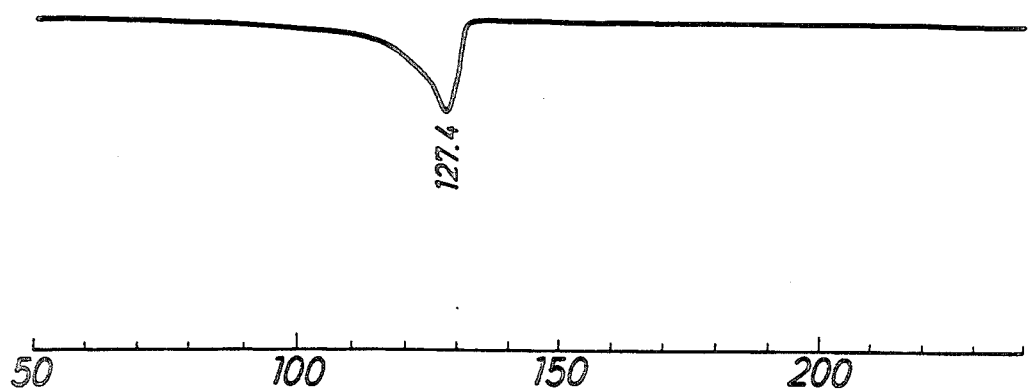
FIG. 30 shows an endothermic characteristic curve obtained when the sample shown in FIG. 29 is subjected to the second temperature elevation measurement (second run).

The endothermic characteristic curve of sample 11 at the first temperature elevation, determined by the differential scanning calorimeter, is shown in FIG. 29, and the endothermic characteristic curve at the second temperature elevation (second run) is shown in FIG. 30.

Figure 33:
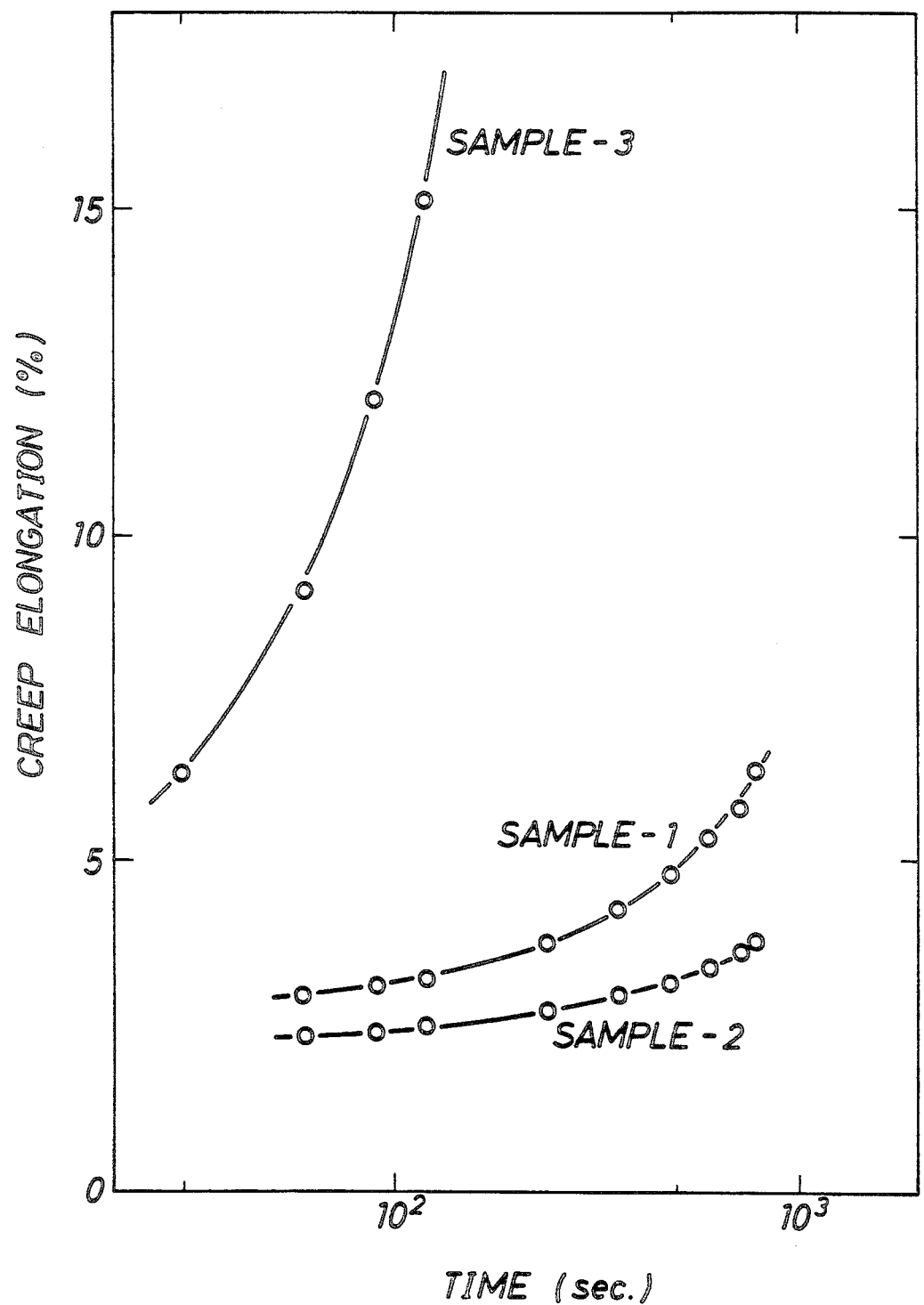
FIG. 33 show creep characteristic curves of the drawn and oriented fibers of the polymers obtained in Example 9, Example 10 and Comparative Example 1.

The inherent crystal fusion peak of sample 11 appeared at 127.4° C., and the proportion of Tp to the total crystal fusion peak area was 37.9%. The creep resistance characteristics of sample 11 were such that $CR_{90}$ was 2.44% and $\epsilon$ was $2.22 \times 10^{-5} sec^{-1}$. The creep characteristics of sample 11 are shown in FIG. 33. After the heat history at 170° C. for 5 minutes, the elastic modulus retention ratio was 106.2% and the strength retention ratio was 104.7%. It was confirmed that the performances were not degraded by the heat history.

EXAMPLE 10

Polymerization for Preparation of Ultra-High-Molecular-Weight Ethylene/Propylene/4-Methylpentene-1 Copolymer As in Example 9, slurry polymerization for the preparation of an ethylene/propylene/4-methylpentene-1 copolymer was carried out in the presence of a Ziegler catalyst in 1 l of n-decane as the polymerization solvent. Prior to initiation of the polymerization, 10 ml of 4-methylpentene-1 as the comonomer and 40 Nml of hydrogen gas as the molecular weight-adjusting agent were collectively added. Ethylene gas containing 1.14 mole % of propylene was continuously supplied to a reaction vessel so that the pressure in the reaction vessel was kept constant at 5 kg/cm². The polymerization was completed in 1 hour at 70° C. The amount of the obtained powdery ultra-high-molecular-weight ethylene/propylene/4-methylpentene-1 copolymer was 115 g, and the intrinsic viscosity ($\eta$) (at 135° C. in decalin) was 10.0 dl/g and the total content of propylene and 4-methylpentene-1, determined by the ultraviolet spectrophotometer, was 2.1 comonomer molecules per 1000 carbon atoms.

(Preparation of Drawn and Oriented Product of Ultra-High-Molecular-Weight Ethylene/Propylene/4-Methylpentene-1 Copolymer)

By using the powdery ultra-high-molecular-weight ethylene/propylene/4-methylpentene-1 copolymer obtained by the above-mentioned polymerization, a drawn and oriented fiber was prepared according to the same procedures as described in Example 9.

The tensile characteristics of the obtained drawn and oriented fiber are shown in Table 12.

TABLE 12

| Sample | Sample 12 |
|---|---|
| Fineness (denier) | 7.8 |
| Draw ratio | 20 |
| Strength (GPa) | 2.93 |
| Elastic modulus (GPa) | 65.9 |
| Elongation (%) | 5.41 |

Figure 31:
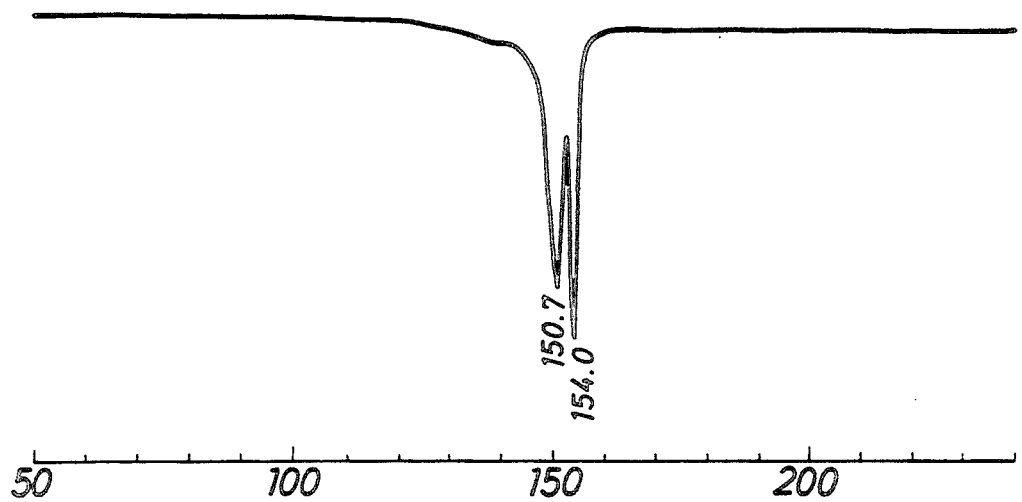
FIG. 31 shows an endothermic characteristic curve of a drawn and oriented fiber of an ultra-high-molecular-weight ethylene/propylene/4-methylpentene-1 copolymer obtained in Example 10, determined by a differential scanning calorimeter in the restraint state.
Figure 32:
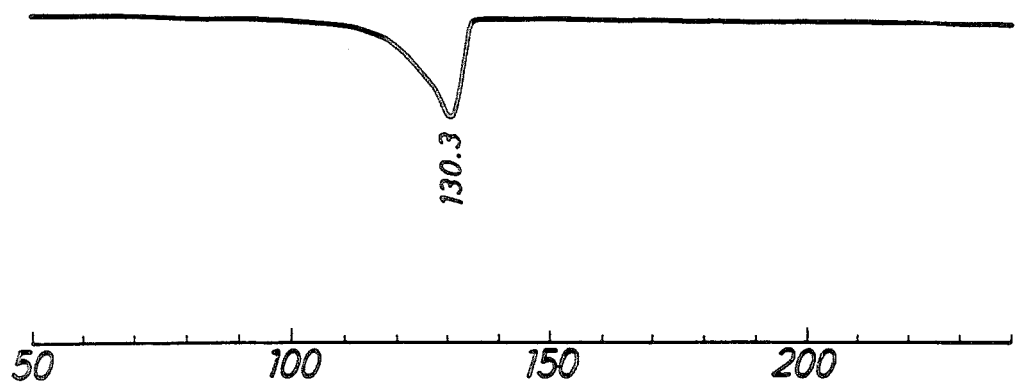
FIG. 32 is an endothermic characteristic curve obtained when the sample shown in FIG. 31 is subjected to the second temperature elevation measurement.

The endothermic characteristic curve of sample 12 at the first temperature elevation (first run), determined by the differential scanning calorimeter, is shown in FIG. 31, and the endothermic characteristic curve at the second temperature elevation (second run) is shown in FIG. 32. The inherent crystal fusion peak of the ultra-high-molecular-weight ethylene/propylene/4-methylpentene-1 copolymer of sample 12 appeared at 130.3° C., and the proportion of Tp to the total crystal fusion peak area was 59.1%. The creep resistance characteristics of sample 12 were such that CR$_{90}$ was 3.12% and $\epsilon$ was $4.67 \times 10^{-5}$ sec$^{-1}$. The creep characteristics of sample 12 are shown in FIG. 33. After the heat history at 170° C. for 5 minutes, the elastic modulus retention ratio was 101.9% and the strength retention ratio was 103.1%. The performances were not degraded by the heat history, as in Example 9.

EXAMPLE 11

With respect to each of the following fibers, the relation between the load F (MPa) and the rupture time T (hours) was examined.

Ethylene/butene-1 copolymer fiber obtained in Example 2:
($\eta$)=9.4 dl/g, 100-filament yarn (1140 denier),
strength=2.21 GPa, elastic modulus=57.3 GPa,
elongation=4.5%

Ethylene/propylene copolymer fiber obtained in Example 4:
($\eta$)=10.4 dl/g, 161-filament yarn (1095 denier),
strength=2.9 GPa, elastic modulus=75.5 GPa,
elongation=4.5%

Ethylene/octene-1 copolymer fiber obtained in Example 8:
($\eta$)=10.66 dl/g, 100-filament yarn (1110 denier),
strength=2.18 GPa, elastic modulus=65.7 GPa,
elongation=3.68

Ultra-High-Molecular-Weight Homopolyethylene Fiber as Comparative Example 3:
($\eta$)=17.5 dl/g, 118-filament yarn (1050 denier),
strength=2.6 GPa, elastic modulus=81 GPa,
elongation=4.2%

A load smaller than the breaking load (room temperature) was applied to each of the above-mentioned fibers at room temperature, and the time (rupture time) which elapsed before breaking of the multifilament yarn was measured.

The obtained results are shown in Table 13 and FIG. 34.

TABLE 13

| Applied Load | 1700 MPa | 1500 MPa | 1250 MPa | 1000 MPa | 750 MPa | 500 MPa |
|---|---|---|---|---|---|---|
| Fiber of Example 2 | 2 | 11 | 60 | 300 | 2000 | — |
| Fiber of Example 4 | — | 0 | 8 | 30 | 200 | 1000 |
| Fiber of Comparative Example 3 | — | — | 6.4 | 44 | 170 | 620 |
| Fiber of Example 8 | | 20 | | | | |

We claim:

1. A molecularly oriented molded body of a high-molecular-weight ethylene/α-olefin copolymer having an intrinsic viscosity ($\eta$) of at least 5 dl/g and such a content of an α-olefin having at least 3 carbon atoms that the number of molecules of the α-olefin is 0.1 to 15 on the average per 1000 carbon atoms, wherein the molded body shows at least two crystal fusion endothermic peaks when the measurement is conducted in the restraint state by using a differential scanning calorimeter, the molded body has at least one crystal fusion endothermic peak (Tp) at a temperature higher by at least 20° C. than the inherent crystal fusion temperature (Tm) of the high-molecular-weight ethylene/α-olefin copolymer determined as the main fusion endothermic peak at the time of the second elevation of the temperature, and the quantity of heat based on said crystal fusion endothermic peak (Tp) is a least 15% based on the total fusion heat quantity; and said molded body has an elastic modulus retention ratio of at least 90% and a tensile strength retention ratio of at least 90% when the molded body is heated at 170° C. for 5 minutes, which is obtained by melt-kneading a composition comprising the high-molecular weight ethylene-alpha-olefin copolymer and a diluent, extruding the melt to form a molded body, and drawing the obtained molded body.

2. A molded body as set forth in claim 1, wherein the α-olefin is butene-1.

3. A molded body as set forth in claim 1, wherein the α-olefin is propylene.

4. A molded body as set forth in claim 1, wherein the α-olefin is an α-olefin having at least 5 carbon atoms.

5. A molded body as set forth in claim 1, wherein the α-olefin is a combination of propylene and a second α-olefin having at least 4 carbon atoms.

6. A molded body as set forth in claim 1, wherein the α-olefin content is 0.5 to 10 α-olefin molecules per 1000 carbon atoms.

7. A molded body as set forth in claim 1, wherein the heat quantity based on the crystal fusion endothermic peak (Tp) is at least 30% based on the total fusion heat quantity.

8. A molded body as set forth in claim 1, wherein the ethylene/α-olefin copolymer has an intrinsic viscosity of from 7 dl/g to 30 dl/g.

9. A molecularly oriented molded filament of a high molecular weight ethylene/α-olefin copolymer having an intrinsic viscosity ($\eta$) of at least 5 dl/g and such a content of an α-olefin having at least 3 carbon atoms that the number of molecules of the α-olefin is 0.1 to 15 on the average per 1000 carbon atoms, wherein the molded body shows at least two crystal fusion endothermic peaks when the measurement is conducted in the restraint state by using a differential scanning calorimeter, the molded body has at least one crystal fusion endothermic peak (Tp) at a temperature higher by at least 20° C. than the inherent crystal fusion temperature (Tm) of the a high molecular weight ethylene/α-olefin copolymer determined as the main fusion endothermic peak at the time of the second elevation of the temperature, and the quantity of heat based on said crystal fusion endothermic peak (Tp) is at least 15% based on the total fusion heat quantity; and said molded body has an elastic modulus retention ratio of at least 90% and a tensile strength retention ratio of at least 90% when the molded body is heated at 170° C. for 5 minutes, which is obtained by melt-kneading a composition comprising the high-molecular-weight ethylene/α-olefin copolymer and a diluent, extruding the melt in the form of a filament and drawing the obtained filament.

10. The molded body as set forth in claim 9 wherein the diluent comprises a solvent for the high-molecular weight ethylene copolymer or a wax which is compatible with the high-molecular weight ethylene copolymer.

11. The molded body as set forth in claim 10 wherein the diluent is a wax selected from the group consisting of paraffinic waxes, n-alkanes having at least 22 carbon atoms, mixtures of said n-alkane and a lower n-alkane, medium-pressure polyethylene waxes, low-pressure polyethylene waxes, high-pressure polyethylene waxes, ethylene copolymer waxes, oxidized waxes and maleic acid-modified waxes.

12. A molecularly oriented and drawn filament of a high-molecular-weight ethylene/α-olefin copolymer having an intrinsic viscosity ($\eta$) of at least 5 dl/g and such a content of an α-olefin having at least 3 carbon atoms that the number of molecules of the α-olefin is 0.1 to 15 on the average per 1000 carbon atoms, wherein the filament shows at least two crystal fusion endothermic peaks when the measurement is conducted in the restraint state by using a differential scanning calorimeter, the filament has at least one crystal fusion endothermic peak (Tp) at a temperature higher by at least 20° C. than the inherent crystal fusion temperature (Tm) of the high-molecular-weight ethylene/α-olefin copolymer determined as the main fusion endothermic peak at the time of the second elevation of the temperature, the quantity of heat based on said crystal fusion endothermic peak (Tp) is at least 15% based on the total fusion heat quantity, the filament has an elastic modulus of at least 20 GPa and a tensile strength of at least 1.2 GPa, and when a heat history at 170° C. for 5 minutes is given to the filament, the elastic modulus retention ratio is at least 90% and the tensile strength retention ratio is at least 90%, which is obtained by melt-kneading a composition comprising the high-molecular-weight ethylene/α-olefin copolymer and a diluent, extruding the melt in the form of a filament and drawing the obtained filament.

13. A drawn filament as set forth in claim 12, which has an orientation degree (F) of at least 0.9.

14. A drawn filament as set forth in claim 12, wherein the α-olefin is butene-1 and when a load (F, MPa) of 750 to 1500 MPa is applied to the filament at room temperature, the rupture time (T, hours) satisfies the following requirements:

$$T \geq 10^{\frac{1700 - F}{330}}.$$

15. A drawn filament as set forth in claim 12, wherein said ethylene/α-olefin copolymer has an intrinsic viscosity of from 7 dl/g to 30 dl/g.

16. A molecularly oriented and drawn filament of a high-molecular-weight ethylene/α-olefin copolymer having an intrinsic viscosity ($\eta$) of at least 5 dl/g and such a content of an α-olefin having at least 5 carbon atoms that the number of molecules of the α-olefin is 0.1 to 15 on the average per 1000 carbon atoms, wherein the filament shows at least two crystal fusion endothermic peaks when the measurement is conducted in the restraint state by using a differential scanning calorimeter, the filament has at least two crystal fusion endothermic peaks (Tp) at a temperature higher by at least 20° C. than the inherent crystal fusion temperature (Tm) of the high-molecular-weight ethylene/α-olefin copolymer determined as the main fusion endothermic peak at the time of the second elevation of the temperature, the crystal fusion endothermic peaks (Tp) comprises a high-temperature fusion peak (Tp1) in a temperature range of from Tm+35° to Tm+100° C. and a low-temperature fusion peak (Tp2) in a temperature range of from Tm+20° C. to Tm+35° C., the heat quantity based on the crystal fusion endothermic peaks (Tp) is at least 30% based on the total fusion heat quantity, the heat quantity based on the high-temperature fusion peak (Tp1) is at least 3% based on the total fusion heat quantity, the filament has an elastic modulus of at least 30 GPa and a tensile strength of at least 1.5 GPa, after a heat history at 170° C. for 5 minutes, the filament has a strength retention ratio of at least 95% and an elastic modulus retention ratio of at least 95%, and the creep (CR$_{90}$) determined as the elongation after the filament has been placed under a load corresponding to 30% of the breaking load at an ambient temperature of 70° C. for 90 seconds is lower than 5% and the creep speed ($\epsilon$) from the point of 90 seconds to the point of 180 seconds under said load condition is lower than $5 \times 10^{-5}$ sec$^{-1}$, which is obtained by melt-kneading a composition comprising the high-molecular-weight ethylene/α-olefin copolymer and a diluent, extruding the melt in the form of a filament and drawing the obtained filament.

17. A drawn filament as set forth in claim 16, wherein the α-olefin is 4-methylpentene-1, hexene-1 or octene-1.

18. A drawn filament as set forth in claim 16, wherein when a lood (F, MPa) of 750 to 1500 MPa is applied to the filament at room temperature, the rupture time (T, hours) satisfies the following requirement:

$$T \geq 10 \frac{1700 - F}{330}.$$

19. A drawn filament as set forth in claim 16, wherein the ethylene/α-olefin copolymer has an intrinsic viscosity of from 7 dl/g to 30 dl/g.

* * * * *